(12) United States Patent
Sun

(10) Patent No.: US 8,122,153 B2
(45) Date of Patent: *Feb. 21, 2012

(54) INDIVIDUALS' URL IDENTITY EXCHANGE AND COMMUNICATIONS

(75) Inventor: Chen Sun, Houston, TX (US)

(73) Assignee: Subdomain Identity Partners, Houston, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 12/428,452

(22) Filed: Apr. 22, 2009

(65) Prior Publication Data

US 2009/0234970 A1    Sep. 17, 2009

Related U.S. Application Data

(63) Continuation of application No. 10/630,335, filed on Jul. 30, 2003, now Pat. No. 7,543,078.

(60) Provisional application No. 60/475,716, filed on Jun. 4, 2003, provisional application No. 60/400,270, filed on Jul. 31, 2002.

(51) Int. Cl.
G06F 15/16 (2006.01)

(52) U.S. Cl. ................ 709/245; 709/200

(58) Field of Classification Search .......... None
See application file for complete search history.

(56) References Cited

U.S. PATENT DOCUMENTS

| | | | |
|---|---|---|---|
| 5,812,769 A | 9/1998 | Graber et al. | |
| 5,862,325 A | 1/1999 | Reed et al. | |
| 6,085,242 A | 7/2000 | Chandra | |
| 6,108,703 A | 8/2000 | Leighton et al. | |
| 6,243,749 B1 | 6/2001 | Sitaraman et al. | |
| 6,374,259 B1 | 4/2002 | Celik | |
| 6,434,745 B1 | 8/2002 | Conley, Jr. et al. | |
| 6,442,602 B1 | 8/2002 | Choudhry | |
| 6,457,047 B1 | 9/2002 | Chandra et al. | |
| 6,671,714 B1 | 12/2003 | Weyer et al. | |
| 6,691,158 B1 | 2/2004 | Douvikas et al. | |
| 6,760,746 B1* | 7/2004 | Schneider | 709/217 |
| 6,917,972 B1 | 7/2005 | Basko et al. | |
| 7,062,561 B1 | 6/2006 | Reisman | |
| 7,072,984 B1 | 7/2006 | Polonsky et al. | |
| 7,302,634 B2 | 11/2007 | Lucovsky et al. | |
| 7,630,986 B1* | 12/2009 | Herz et al. | 709/217 |

OTHER PUBLICATIONS

Ardissono, Liliana et al. "Tailoring the Interaction with Users in Web Stores." User Modeling and User-Adapted Interaction 10:251-303. Klower Academic Publishers, 2000.*
Berners-Lee, Masinter, McCahill, RFC 1738—Uniform Resource Locators (URL), Dec. 1994, Network Working Group.
Gabber, Eran et al. "On Secure and Pseudonymous Client-relationships with Multiple Servers." ACM Transactions on Information and System Security, vol. 2, No. 3, Nov. 1999, pp. 390-415.
Yeo, A.K. et al. "A Taxonomy of Issues in Name Systems Design and Implementation." SIGOPS Operating Systems Review, Jul. 1993, ACM Press, vol. 27 Issue 3, pp. 4-18.

* cited by examiner

*Primary Examiner* — Jeffrey R Swearingen
(74) *Attorney, Agent, or Firm* — Osha • Liang LLP

(57) ABSTRACT

A method for managing data associated with a data profile involves providing a web server hosting facility, providing a set of remote-hosted second.top domains, storing, on the web server hosting facility, a set of web-accessible data profiles for a third level domain name of the set of remote-hosted second-.top domains with any file suffixes, and searching and extracting data from the set of web-accessible data profiles to obtain extracted data.

18 Claims, 20 Drawing Sheets

Overview

VSAFS with easy user file suffix change module sSDFS with easy user file suffix change module sSDFS display sSDFS with easy user file suffix change process and no redirector Iweb, ndfSDpFDA profile usage, &
nSD branding

INDIVIDUALS' URL IDENTITY EXCHANGE AND COMMUNICATIONS

CROSS-REFERENCE TO RELATED APPLICATIONS

This application claims the benefit of U.S. Provisional Application Ser. No. 60/400,270 filed on Jul. 31, 2002 by Chen Sun and U.S. Provisional Application 60/475,716 filed on Jun. 4, 2003 by Chen Sun.

This application is a continuation of U.S. patent application Ser. No. 10/630,335, entitled "INDIVIDUALS' URL IDENTITY EXCHANGE AND COMMUNICATIONS", and filed on Jul. 30, 2003, now U.S. Pat. No. 7,543,078. Accordingly, this application claims benefit from U.S. patent application Ser. No. 10/630,335 under 35 U.S.C. §120.

TECHNICAL FIELD OF INVENTION

This invention relates to personal digital representation and identity, web exchanges (marketplaces) that work with these, and contacts management. The invention uses subdomains, URLs, and spam-resistant communications to represent an individual.

FEDERALLY SPONSORED RESEARCH

Not applicable

SEQUENCE LISTING OR PROGRAM

Not applicable

INCORPORATION BY REFERENCE

U.S. application Ser. No. 09/642,127 filed by Azkar Choudhry on Aug. 18, 2000, now abandoned, and Ser. No. 10/190,283 filed Jul. 5, 2002, now abandoned; U.S. application Ser. No. 09/853,167 filed jointly by Chen Sun and Azkar Choudhry on May 11, 2001, now abandoned; and U.S. application Ser. Nos. 10/074,081, now abandoned, and 10/189,063, now abandoned, filed by Chen Sun on Feb. 1, 2002 and Jul. 2, 2002 respectively; are incorporated herein by reference in their entirety, including drawings and any microfiche appendices, and are hereby made a part of this application.

BACKGROUND

I. Individual Representation Using Web Handles

Many types of individuals' information exchange currently take place on the Internet, and frequently the individuals are represented by web handles. For example, dating websites and discussion forums frequently represent individuals by web handles. Web auctions use web handles to represent individual sellers and buyers. Examples are "fromglobaltoyou", "browneyedgirl022", "faithingintheprize", "beauty25", "lively505", and "beach296" where these represent individuals.

A characteristic of web handles is that laymen web users can easily register for one through filling out the forms sent by the website involved. Another characteristic is that the web handle's branding, as well as its privacy (the degree of information that is released by the web handle) is within the website.

The disadvantages of handles are that these are unprofessional-sounding names and registering for these names takes time. Perhaps more importantly, once attained, a web handle's branding value remains within the issuing website and doesn't carry to other sites or outside of the Internet.

II. Individual Representation Using Email Address

Another frequent form of individual representation on the Internet is email address. This form suffers from a number of disadvantages:

email address gives a channel of communications, but conveys very little individual information. That is, email address doesn't state name, title, occupation, etc.

the current form of SMTP email is highly subject to email spam, and studies now show that an average individual spends more time clearing away spam than receiving legitimate email. Spam are large quantities of unsolicited emails, frequently sent by unscrupulous promoters of pornography, get rich schemes, etc.

At present, the most common form of individual representation is the paper business card, which frequently has SMTP email addresses printed and are subject to being spammed. Once spam starts, SMTP email becomes difficult to manage and use.

III. Individual Representation Using URLs, Part 1

Using a URL to represent individuals would solve the branding problems of web handles, but would cause privacy and URL-naming control difficulties.

Using a URL is illustrated in U.S. Pat. No. 6,085,242, "Method for managing a repository of user information using a personalized uniform locator", by Rohit Chandra, which uses an unique code placed in front of a domain for a individual representation in Chandra's system. As such, identically named subdomains cannot be used. For example, Chandra's invention cannot use several "Joe" as subdomains, as in Joe.GM.com, Joe.Ford.com, and Joe.Microsoft.com.

In a document TDB0901.0055 posted by IBM on "e-business card system", a URL is again used, with the example "e-buscard.ibm.com/12345. Here, the person's name is not in the URL, and there is no privacy control.

IV. Representation by URLs, Part 2

In patent application Ser. Nos. 09/853,167 by Chen Sun and Azkar Choudhry; 09/642,127 by Azkar Choudhry; and 10/189,063 and 10/074,081 by Chen Sun, it is shown that virtual subdomains addresses, a type of URL, have a syntax of Subdomain.Domain, and can represent individual's information.

The problem remained that using Subdomain.Domain for individual identification offered the individual limited privacy, as the individual's information URL is easily accessible by anyone.

Privacy can be solved by using password protection on the subdomain-domain displayed webpages. However, this would require additional steps in sending, memorizing, recalling, and typing passwords.

Privacy can also be solved by adding a file suffix that is not known to others. For example, addressing http://Joe.GM-.com/56kje26 may show Joe's private deals that he offers only to customers, who know the "56kje26" private file suffix.

This Subdomain.Domain/FileDirectory syntax to represent an individual can have many advantages including:

Easy to verbally communicate personal contact information.

eMail capable by adding http:// to SDFD and sending it as a link.

Digitally manageable, as a SDFD can represent an addressable URL.

Print version capable by printing from http://SDFD.

Downloadable data to PCs through http://SDFD.

eCommerce capabilities

Exchangeable data

Database information included

Abundant information capable

There arises a need for an effective means of using URLs for individual representation that is spam-resistant, is useful in exchanging information, and has privacy capabilities; and a need for web exchanges that can use such an individual representation.

OBJECTS AND ADVANTAGES

Several objects and advantages of the present invention are:
1. a system of using URLvs (URL name without the protocol) to represent individuals, easily communicated by speech, writing, and digital technologies,
2. such URLv representation also provides a degree of privacy for the individual through file directory name change,
3. a system of using such URLvs together with new exchangeable websites such that the individual can use his URLv to quickly register in a website, saving him time and giving the website's an efficient way of extracting information about the individual,
4. a spam-resistant channel of communications to contact the individual through or made known through URLv addressing,
5. a system of branding the individual and his associated organization throughout the above, and
6. a contacts management system using the above.

Further objects and advantages of my inventions will become apparent from a consideration of the drawings and ensuing description.

SUMMARY

FIG. 4 shows an overview of this invention's individual representation-IWeb interaction. It comprises of the following, which will be explained later:

A system of nURLvs with the syntax of name-Subdomain-Domain (nSD) (1) and name-Subdomain-Domain-File Directory (nSDFD) (2), which can form webpage profiles of the individual whose name is the subdomain's name, A http://nSD webpage (3) containing a spam-resistant, public communications channel, which can be as simple as a webpage form email, as shown (7), The various ndfSDFD (df—data field) and nSD profiles can enter (4) into different IWeb (5) web individuals' exchanges sites, and thus, the individual's nSD carries branding and interaction across multiple exchanges and sites, The various ndfSDpFD can have a privacy control system module (pcsm) (6) which enables named layman user to modify his FD while retaining its original web content.

IWeb (5) websites with software services that allow for extraction and exchange of data fields of individual information using ndfSDFDAs, and The branding (8) of the individual and his organization based on the text of nSD.

Not shown is ndfSDpFDA's authorization process for IWeb participation.

FIG. 12 presents a second overview.

BRIEF DESCRIPTION OF THE DRAWINGS

The figures presented herein when taken in conjunction with the disclosure form a complete description of the invention, wherein elements and steps indicated by like reference indicators are the same or equivalent elements or steps.

GLOSSARY

The URLv acronyms are formed by using abbreviations in combinations. This glossary provides a brief summary of these abbreviations.

URLv (URL verbal) is a URL name without the protocol, hence the portion after the "http://".

Abbreviations used in URLv—e.g. ndfSDpFDA n is individual's name or representation of his name, df indicates that its web content has exchangeable data fields S is the subdomain D is the domain p indicates that the file directory has an associated privacy control system module FD is a file directory A (all) indicates that this URLv can be either a ndfSD or ndfSDFD with the same individual's named subdomain and domain.

Other abbreviations used in URLv

FS is file suffix

FD/ is file directory with an ending "/"

FD and pFD—when used independently, implies nSDFD or nSDpFD.

A family of nSDFDAs includes all the same-nSD-prefixed nSD and nSDFDs.

VSAFS—virtual subdomain address file suffix—a type of SDFS using the technology described in patent application Ser. No. 10/189,063.

privacy control system module (pcsm) allows laymen, including the named individual of a nSDpFD, to change nSDpFD's file directory name easily, while retaining the original web content.

hWeb is a prior-art type of website where individuals exchange and share information with other individuals and this information may lead to other kinds of exchanging. Individuals have representation in these sites, usually as web handles.

IWeb are software and sites similar to hWeb, with the primary difference that its individual representation is a ndfS-DpFDA or other nURLv forms.

nSD-text-as-identity—using the text portion of a nSD as an identity in an IWeb.

DETAILED SPECIFICATIONS

We will explain the invention in these following sections:
I. Prior art of web server and the Internet environment
II. Overview of the invention as a system
III. (a-j) Naming—value of the preferred nURLv—ndfS-DpFDA naming & design.
IV. (a-e) Information exchange methods between ndfSD-pFDA and IWebs
V. (a-h) Privacy control system module on pFD.
VI. Spam-resistant public communications channel.
VII. Searchable index of nSDs with spam control public communications channel
VIII. Second Overview
IX. Embodiment—IWebContacts, a contacts manager
X. Additional embodiments
XI. Impact of using ndfSDpFDA and Iwebs and more embodiments
XII. IWeb's Individual Identity
XIII. Branding characteristics of IWebs, ndfSDpFDA
XIV. ndfSDpFDA web content authorizes interaction with IWeb
XV. Variants
XVI. Summary The attached glossary helps with the terminology.

I. Preferred Web Server and Overview of the Internet

The invention is preferably realized using an Apache HTTP (Hyper Text Transfer Protocol) Web Server as the basic platform. The Apache server is well known within the art, and is possibly the most popular web server used today. Many webmasters are capable of configuration and installation of such a server, and they can be readily obtained from companies such as Apache Digital Corporation of Durango, Colo.

Figure 1:
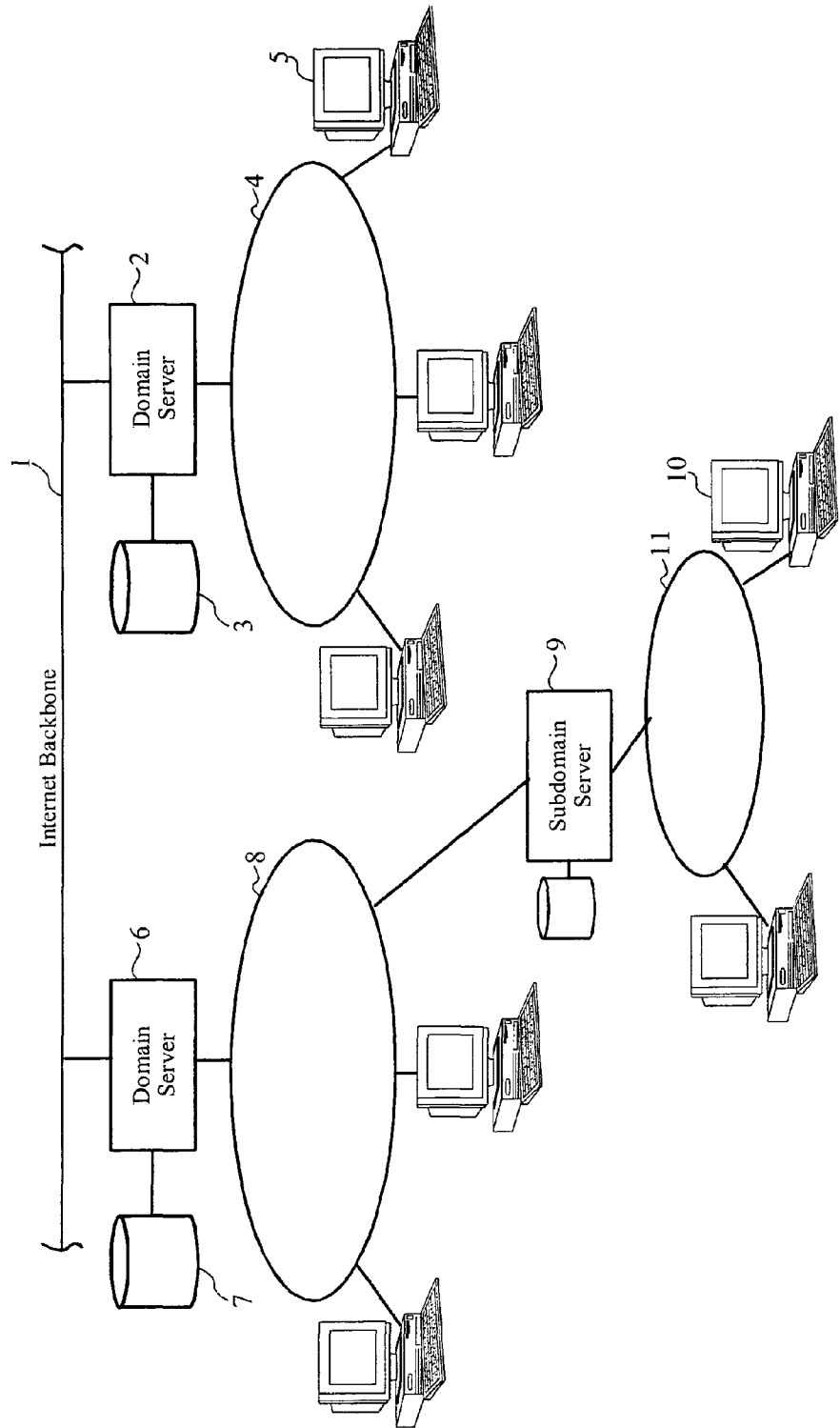
FIGS. 1.-3. (Prior Art) show system diagrams in accordance with one or more embodiments of the invention.
Figure 2:
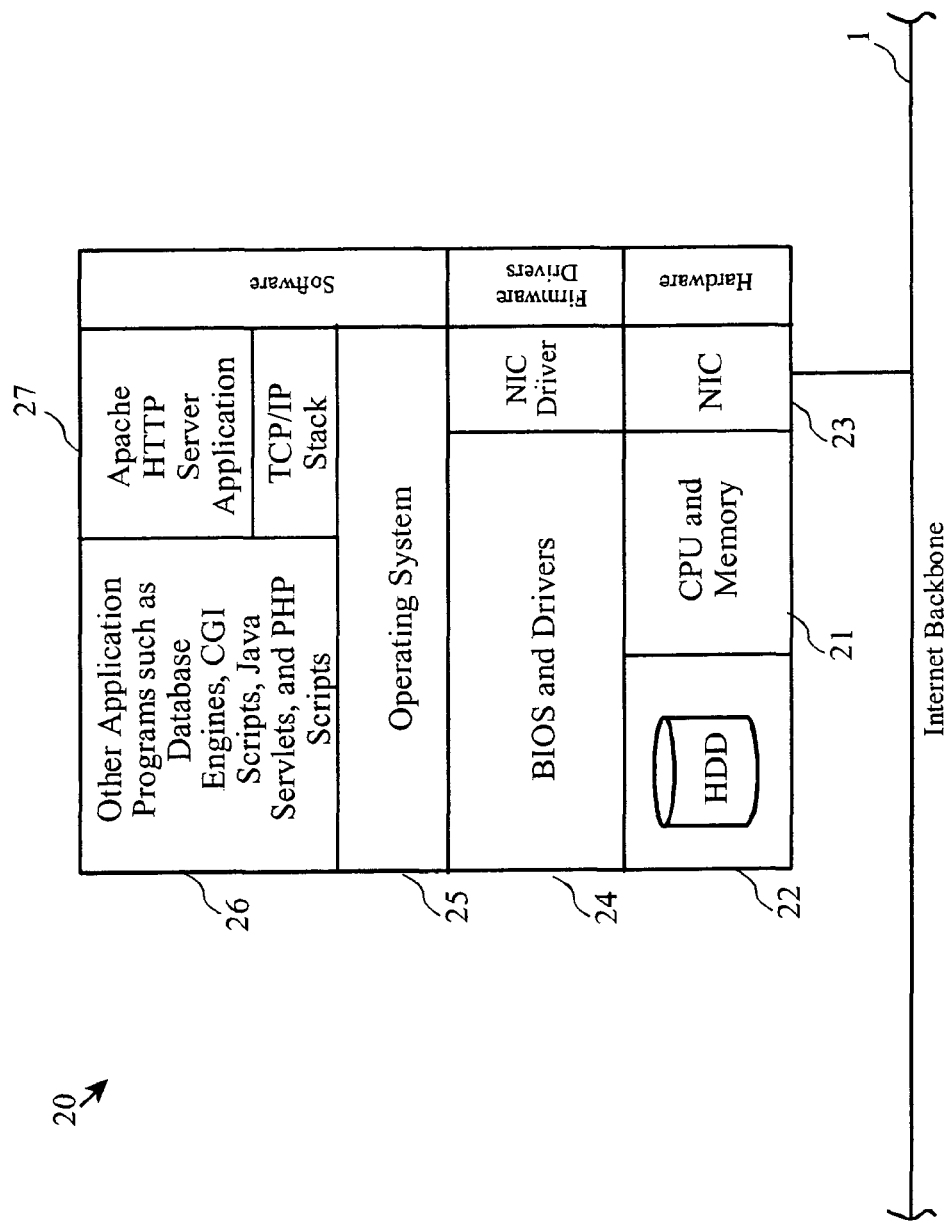
Figure 3:
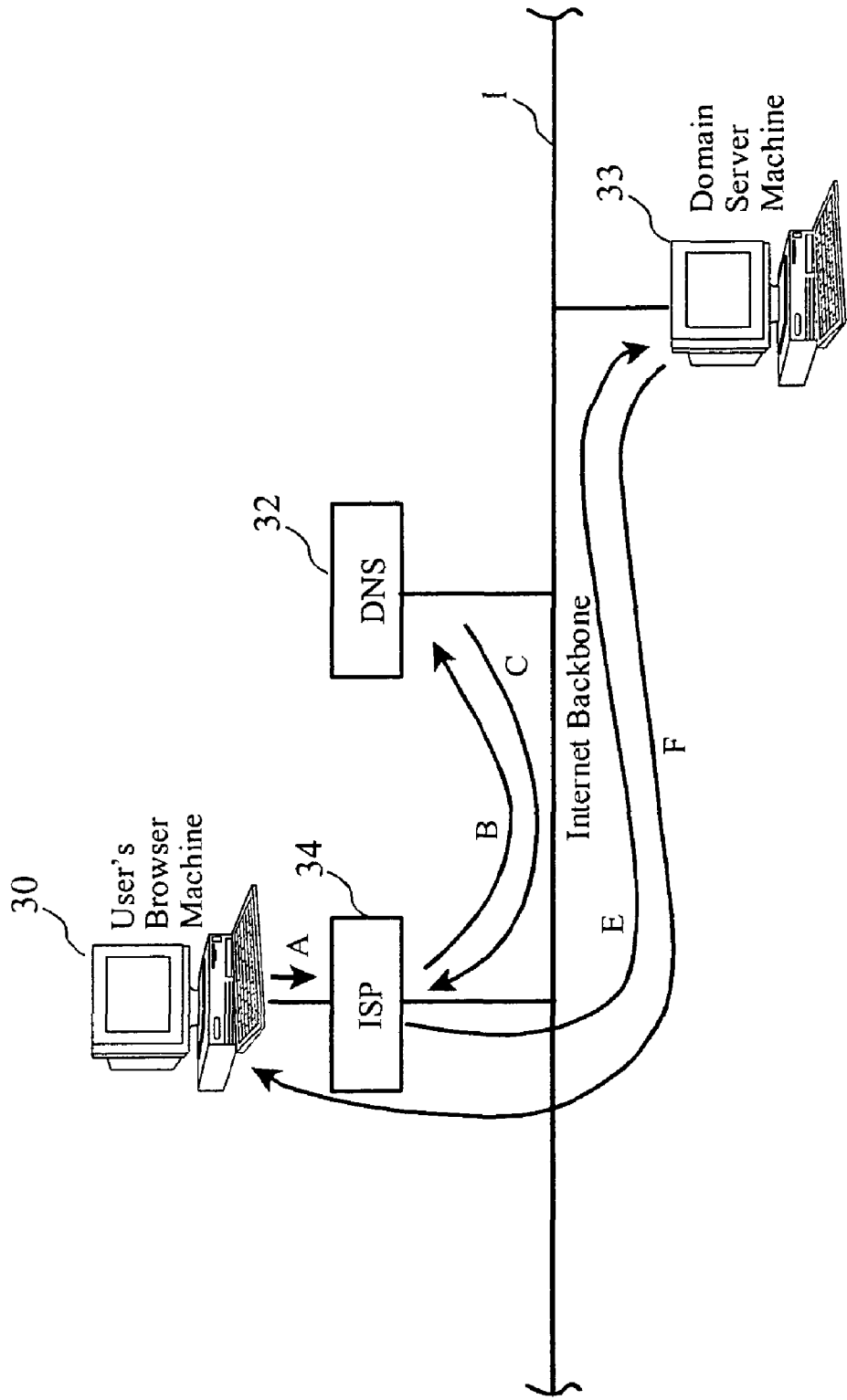

FIGS. 1-3 are well known prior art; these figures are directly from patent application Ser. No. 09/853,167 submitted May 11, 2001 by Chen Sun and Azkar Choudhry. FIG. 1 (Prior Art) shows the well-known Internet architecture of domain and subdomain servers. FIG. 2 (Prior Art) shows the well-known architecture of an Apache HTTP server. The server is a combination of a computer platform with specialized software. The computer platform generally consists of a central processing unit ("CPU") with memory (21), one or more hard disk drives ("HDD") (22), and a network interface card ("NIC") (23). This may be an IBM-compatible personal computer, as in the preferred embodiment, or Sun workstation or other suitable standard computer platform. A Basic Input/Output System ("BIOS") and set of low level driver firmware modules (24) typically interfaces the higher-level software to the hardware, including a NIC driver. A multi-tasking operating system ("OS") (25), such as Microsoft Windows NT, Linux, Unix or IBM OS/2, is also installed on the computer platform. Linux is the operating system of the preferred embodiment.

The Apache HTTP server software (27) is available for free download from the Apache Software Foundation at http://www.apache.org. It is an application program which interfaces to the Internet (1) through the NIC (23) and a Transmission Control Protocol/Internet Protocol ("TCP/IP") communications protocol stack. The TCP/IP stack may be native to the OS, or it may be supplied as a separate but compatible module with the Apache application and the OS. Other application programs (26) such as database engines, CGI scripts, Java servlets and PHP scripts may be executed on the same platform simultaneously to the Apache HTTP server application. PHP/FI is a scripting language that supports dynamic HTML pages. It is similar to Apache's SSI, but more complex and has database modules for the most popular databases. PHP/FI is a product of Iquest Internet of Indianapolis, Ind. In the preferred embodiment, the NIC is a 100BaseT local area network interface card, interconnected to the Internet (1) via one or more routers.

FIG. 3 shows the well-known arrangement of Internet browser computers, Domain Name Servers ("DNS"), Internet Service Providers ("ISP"), and domain servers. The internal architecture of domain name servers is fully described in RFC 1035. In general, when a user selects a network address, such as "http://www.anycompany.com", in his web browser software, the browser machine (30) transmits a request (A) to the ISP (34). The ISP (34) then contacts (B) the DNS (32), which returns a translation (C) of the text-based URL to a numerical IP address value. The user's browser then requests (E) a document from the domain server (33) located at the IP address given by the DNS. The domain server (33) transmits (F) the document, typically in HTML, to the browser machine (30) via the ISP.

II. Overview of the Invention in a System

Figure 4:
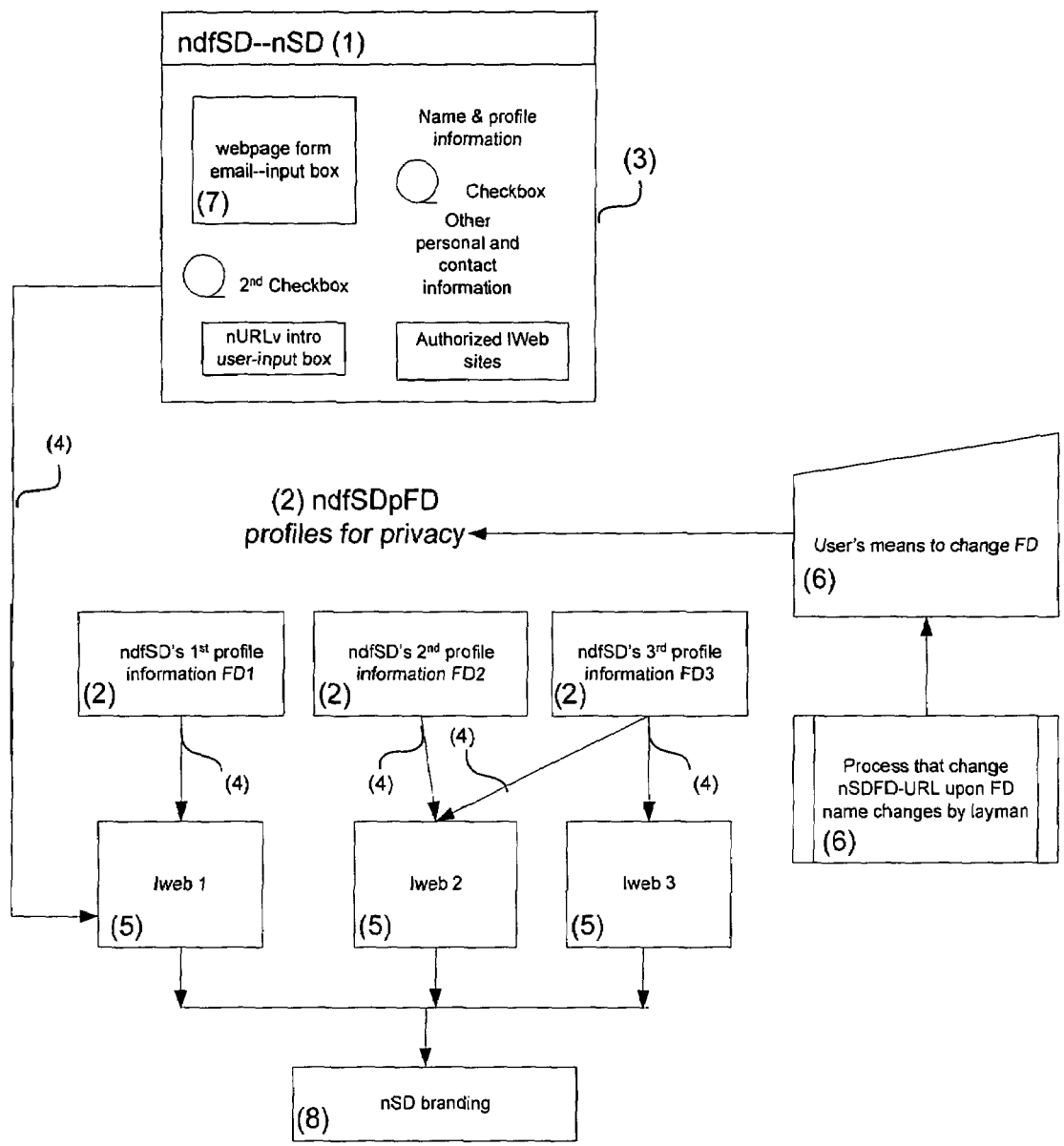
FIG. 4. shows an overview of the invention in accordance with one or more embodiments of the invention.

FIG. 4 shows an overview of such individual representation-IWeb interaction. It comprises of the following, which will be explained later:
A system of nURLvs with the syntax of name-Subdomain-Domain (nSD) (1) and name-Subdomain-Domain-File Directory (nSDFD) (2), which can form webpage profiles of the individual whose name is the subdomain's name,
A http://ndfSD webpage (3) containing a spam-resistant, public communications channel, which can be as simple as a webpage form email, as shown (7),
The various ndfSDFD profiles can enter (4) into different IWeb (5) web individuals' exchanges sites, and thus, the individual's nSD carries branding and interaction across multiple exchanges and sites,
The IWebs can manipulate the profiles information,
The various ndfSDpFD can have a privacy control system module (pcsm) (6) which enables named layman user to modify his pFD while retaining its original web content.
IWeb (5) websites with software services that allow for extraction of data fields of individual information using ndfSDFDAs, and
The branding (8) of the individual and his organization based on the text of nSD.
Not shown is ndfSDpFDA's authorization process for IWeb participation.

III. Preferred nURLv Name Embodiment ndfSDpFDA

IIIa. Naming

Background on URL Syntax

URLs (Uniform Resource Locators) are normally used for Internet's addressing. A sample one is http://www.CompanyA.com/deptA/productA/specs.html. The "/", ".", and ":" separate the characters, and the location of the characters have a name. "http" is the protocol. "com" is the top level domain name. "CompanyA.com", the second level domain and also called the domain. Unfortunately, "CompanyA" without the ".com" is also frequently called domain, and to clarify this, we will call "CompanyA", adomain. The "www" is the subdomain (also known as third-level domain name). "deptA/~productA/specs.html" is the file suffix and contains parts "specs.html"—the file name, and "deptA/~productA/"—the file directory. Additional letters and separators "." can be placed in front of the subdomain to form sub-subdomains (fourth level domains), sub-sub-subdomains (fifth level domains), and so forth.

Unfortunately, both "/deptA/~productA" and "/deptA/~productA/" (with an ending "/"), are called file directories. File directories without file names following can be used in a URL because web servers usually will supply a default file name, such as index.html. In this application, when FD or FD/ (with an ending "/") is used, it indicates a file directory using a default web content file. The exact details on how to achieve this by its web server are known within the arts.

IIIb. Naming

Abbreviations Used in URLv Individual Representation

When URLs are spoken or printed, frequently the http:// is dropped, because http protocol addressing is predominant. For example, if the correct URL is http://Joe.GM.com/cars; then, when spoken, "Joe.GM.com/cars" is commonly verbally used. An URLv is a URL name without the protocol, hence the portion after the "http://". URLv is the abbreviation for URL verbal, emphasizing that the verbal (spoken, written, printed) communications aspects of this invention are important in its usage. A nURLv is a URLv with a person's name or representation of his name in the front of the URLv. The nURLv used in this invention has an individual's name or representation of a name in its third level domain name (subdomain), then also have second and first level domain names, and may or may not have a file suffix.

Abbreviations are frequently used in this application to describe parts of and constraints of a URLv. An URLv subdomain-domain-file suffix combination is abbreviated SDFS; subdomain-domain-file directory combination is SDFD; subdomain-domain combination is SD. FSs include FDs.

A more complicated abbreviation is ndfSDpFDA, where:
n is individual's name or representation of his name,
df indicates that its web content has exchangeable data fields
S is the subdomain
D is the domain
p indicates that the file directory has an associated "privacy control system module"
FD is a file directory
A (all) indicates that this URLv can be either a ndfSD or ndfSDFD with the same individual's named subdomain and domain.

To best understand this invention from an URL technology perspective, note that though many combinations of abbreviations are possible, there are only three structural syntaxes in this invention that URL "technology" manipulates—SD (subdomain-domain), SDFD (subdomain-domain-file directory), and SDFS (subdomain-domain-file suffix). Additionally, note that the http addressed entity of nURLv is usually a webpage, represented and located by a URL technology using SD, SDFD or SDFS. So, where a constrained form of SD, SDFD, or SDFS is stated below, it is generally implied, that from a URL-technology-manipulation perspective, broader forms of SD, SDFD, or SDFS can also be used. For example, if a ndfSDpFDA is used in a URL, a SDFD (the broader form) would also work in the URL. The exception is when df is included, and if an IWeb uses df (data fields), these will be require dfs in the nURLv.

IIIc. Terminology Clarification

Identity is an individual's continual naming and will be seen as the text of the nSD. An individual may have several identities by having several nSDs. Profile is a web view of the individual—one of many nURLv s (ndfSDFDAs) that an individual may have. Sometimes "FD" or "FS" is independently written as having a profile, and it is inferred that these FD or FS have a nSD (e.g. nSDFD or nSDFS).

nURLv is a generic syntax, and the invention's preferred embodiment is ndfSDpFDA. nURLv embodiments can include ndfSDpFD, nSDpFD, nSDFD, nSD, nSDFS, ndfSDFS, ndfSDpFS, and higher level subdomains. IWebs can work with other nURLv syntax, as will be later explained, and the general ideas of the IWeb and ndfSDpFDA interactions, which are part of this invention, can be read using nURLv and other nURLv forms instead of ndfSDpFDA. However, the spoken and written channels of communications of this invention are valuable. SD or SDFD represent the most efficient and socially preferred means of spoken or written communicating of this invention's profiles. ndfSDpFDA adds data field exchange, naming, and privacy enhancements to SD and SDFD, but do not interfere with their spoken or written communications. Hence, ndfSDpFDA is the preferred nURLv form. The digital transmission and communications of the numerous other nURLv forms can be as efficient and usually the FD/ version is more efficient than the ndfSDpFDA, but here, we are concerned with the spoken, written, and digital means of communications channels, particularly the former two, and thus, ndfSDpFDA is the best.

IIId. Terminology hWeb and IWeb

A hWeb is a prior-art website where individuals exchange information and this information may lead to other kinds of exchanging. hWebs have a representation entity for its individuals. Some examples are: eBAY.com where web-handled-represented individuals exchange information that leads to products and money exchanges; Matchmaker.com where web-handled-represented individuals exchange dating information; employment websites where email-address-represented individuals exchange resumes for employment opportunities; and web discussion forums where web-handled-represented individuals exchange their views.

IWeb is a type of website or software that uses a nURLv (preferably ndfSDpFDA) as its method to identify and represent individuals. Iwebs can be constructed by modifying prior art hWebs or created independently.

IIIe. Naming Step 1 nSD—Social Parallels of "Name.Organization" and "Subdomain.Domain"

In step 1 of forming the name of the preferred nURLv, we will show the semantic naming association of an individual's name to his organization and its social parallel to the named-subdomain-and-domain combination.

Individuals have social meaning as part of an organization, whether this is an employee within a company, a citizen within a city, a member within an association, and many other forms of individual-organization. In this application, "organization" is defined as any groups of people, including businesses, non-profits, charities, informal associations, cities, states, nations, clubs and even descriptions of classes of people. These organizations frequently have websites with their organization's domain name.

One way of creating a naming system for individual representations is by associating an individual's name (Name) with his organization name, using the syntax "Name.Organization" or "Organization/Name." For examples, "Florence.RedCross" or "NASA/John". When "Organization" is replaced by the Organization's domain name, this representation can be "Name.Domain" or "Domain/Name." For examples, Florence.RedCross.org and NASA.gov/John. Individuals will generally prefer Name.Domain over Domain/Name because their name is first. Name.Domain is also more useful in marketing because the individual will tend to promote his representation better having his own name first.

Name.Domain abbreviated in URLv is nSD. A little letter "n" adds a constraint to SD, SDFD, or SDFS that the subdomain is an individual's "name" or "representation of an individual's name". An example of nSD is Joe.GM.com, where "Joe" is the individual's named subdomain, "GM.com" is his associated domain. An example of nSDFD can be Joe.GM.com/sedans, where "sedans" is his file directory of sedans.

IIIf. Naming Step 2 nSD, nSDFD, and nSDFDA Family—Individual Representation & Identity (nSD) and his Profile Representations (nSDFD)

In step 2 of forming the name of the preferred nURLv, we will explain the need for the benefits of subdomain for continual identity and multiple file directories as privacy control in representation.

The nURLv syntax structure portion "nSD" (named subdomain.domain) can be used as an individual's representation and identification because, when compared to the latter portion ("FD" & "FS"—which relate to URL file suffixes), the "nSD" is relatively unchanging, thus providing continual identification. It is relatively unchanging because, from a technology perspective, after the named subdomain is registered as a subdomain, changing it usually requires some degree of technical effort by the domain administrator. Additionally, there are technical issues on DNS update propagation delays, which makes changing subdomains unfavorable. On the other hand, the file suffix portion is frequently and quickly changed by programmers and administrators.

Though an individual representation and identity system can use the nURLv syntax nSD, such a system lacks a degree of privacy for the named individual, because all the web content of http://nSD would be viewable by all those who know such URL. An URL's file directory name (FD) can provide privacy when the file directory is privately known. For example, Joe of GM.com may have an unusual file directory name, eg "56kje26". http://Joe.GM.com/56kje26, is privately known only to his special customers, and when addressed would show a web page of Joe's GM special car offerings. As long as his special customers keep this URL private, the URL remains private.

FDs can also show different profiles of information about an individual, and a FD without any additional "/" is, of course, the shortest and easiest way to communicate file suffix and file directory. For example, Joe of GM.com can have Joe.GM.com/Buick, Joe.GM.com/Chevy, Joe.GM.com/sedans, and Joe.GM.com/56kje26, each showing a different profile of Joe's car offerings. These FDs "Buick", "Chevy", "sedans", and "56kje26" are brief and easy to communicate.

A SDFDA (A meaning All) is a SD or its same-SD-prefixed SDFDs. And a family of nSDFDAs includes all the same-nSD-prefixed nSD and nSDFDs. So, here Joe of GM.com's nSDFDA's family includes Joe.GM.com, Joe.GM.com/Buick, Joe.GM.com/Chevy, Joe.GM.com/sedans, and Joe.GM.com/56kje26.

The techniques for creating http://nSDFD are known within the arts. In one technique, a web server administrator places an individual's name as a subdomain name in the domain's DNS tables, sets this subdomain to a web server address. At the web server, he can create a directory in the domain by using "mkdir" command or create a directory using a FTP software, such as wsftpro, which can be downloaded from www.ipswitch.com. A file capable of supplying web content to browsers is placed in this directory. This file is given the name of the web server's directory default file name. Patent application Ser. No. 10,189,063, "Virtual Subdomain Address File Suffix", by Chen Sun shows another version—using virtual subdomain address file suffix, where the subdomain name is not within the DNS tables. Despite these three different addressing or creation mechanisms, a nSDFDA's syntax remains the same.

IIIg. Naming Step 3 nsDpFD—pFD Privacy Control System Module (pcsm)

In step 3 of preferred nURLv name development, we will see the need for a privacy module.

Once the FD of a private nSDFD is known to those outside the intended private parties, the http://nSDFD has lost its privacy value. To enable for profiles privacy, the individual needs to change his file directory name while retaining its original web content. A lower case letter "p" adds the constraint to nSDpFD that the FD also has an associated easy-to-use FD name change process that retains its original web content.

Laymen using the web haven't been able to change or move FDs much because URL design is typically under the control of and requires the high-in-demand-time of web administrators and programmers. The invention's privacy control system module (pcsm) will allow for laymen, including the named individual of a nSDpFD, to change nSDpFD's file directory name easily, while retaining the original web content. Thus, individuals attain FD privacy control without using programmers and administrators' time.

IIIh. Naming Step 4 ndfSDpFDA—Web Content has Data Field Information (df)

In step 4 of the preferred nURLv naming, data fields are included.

HTML forms the majority of web content, and HTML is usually without structured database fields (data fields). In the preferred nURLv embodiments, the web content of an addressed nURLv has data fields. IWebs can extract information from such data fields. "df" in a ndfSDpFDA indicates that data fields are available in the web content.

IIIi. Preferred nURLv Name Embodiment

Advantages of ndfSDpFDA in Identification, Representation and IWeb Exchanges The ndfSDpFDA formed through the above four steps is the preferred nURLv because it has a number of advantages useful for individual representation as well as for exchange with IWeb. We saw the reasons why ndfSDpFDA is preferred through its construction above, summarized below:
1. each ndfSD is unique (due to DNS) and relatively unchanging, which helps to continually identify the person across multiple IWebs as well as throughout the Internet.
2. the ndfSDpFDA family can have multiple profiles, each of which can provide privacy and convey different profiles of information.
3. the pFD has an associated process that enables the privacy to be maintained by allowing laymen to change the file directory name while retaining the original content.
4. the df allows for data field exchange with IWebs, forming new web marketplaces and communities.
5. The ndfSDpFDA can easily be communicated verbally (orally), in writing, or through digital transmission.

In addition, as a ndfSDpFDA is a URLv, it also has further advantages:
6. eMail capable by adding http:// to ndfSDpFDA and sending it as a link.
7. Digitally manageable, as a ndfSDpFDA can easily form an addressable URL.
8. Print version capable by printing from web content of http://ndfSDpFDA.
9. Downloadable data to computing devices through http://ndfSDpFDA.
10. eCommerce capabilities.
11. Database information capable
12. Abundant information capable.

IIIj. Naming

Syntax Constraints—"n", "p", "A", "df"

The letters "n", "A", "p", and "df" added to SDFDs do not change the URLv structure, but only add constraints to the subdomain, file directory, or web content. Also, as should be obvious, naming combinations with these constraint letters are subsets of the URLvs without these constraints—hence ndfSDpFD is a subset of a nSDpFD, which is a subset of SDpFD, which is a subset of SDFD. The two following examples show how, from a URL technology manipulation perspective, SDFD structure can remain the same when used in URL addressing, despite constraint letters added.
   A ndfSDpFDA is designed to interact with an IWeb. An IWeb does not have a "technology" way of knowing whether a ndfSDpFD has a person's name or name representation as the subdomain because the "n" defined above is a social convention. So, the IWeb can technically use any dfSDpFDA.
   An IWeb generally does not reliably know the difference between a SDFD and a SDpFD. This is because once a URLv is Internet addressed, the http data communications and IWeb generally doesn't distinguish between whether the file directory had been created by a privacy control system module or not. So, the IWeb generally can use SDFD or SDpFD similarly.

So, where a constrained form of SD, SDFD, or SDFS is stated below, it is generally implied that from a URL-technology-manipulation perspective, broader forms of SD, SDFD, or SDFS can also be used. The exception is when df is included, and if an IWeb uses df (data fields), these will be required.

IIIk. Economic, Social, Marketing, and Technical Differences Between nDFD and nSDFD nDomain/file-directory URLv (nDFD), where the second level domain represents the individual's name can technically accomplish most of nSubdomain.Domain/File-Directory (nSDFD) capabilities. However, relatively few individuals have adopted using nDFD for a number of reasons. First, domain name ownership and website hosting are costly and time-consuming. For example, website hosting company typically charges $25 per month for domain registration and website hosting. The same domain hosting service fee can typically provide for magnitudes more subdomain names and their hosting; thus, if 1000 subdomains were used, each individual's allocated cost is 2.5 cents per month. Second, website development, upgrade, and maintenance can be very costly for the individual. When the individual's nSDFD is tied to an organization, the organization pays for the subdomain website development, upgrade, and maintenance and spreads out its cost among its many individuals. Third, the syntax of the Name.Domain/Profile (nSDFD) is valuable, because it gives a way of identifying the individual with his associated organization, which reflects more of the social workings of civilization. A nD/FD profile syntax reflects the individual, but doesn't reflect his organizational affiliation. Socially, a person has meaning within organizations; hence, the Name.Organization/Profile syntax parallel to Name.Domain/FD (nSDFD) syntax is valuable. With the lower costing, lower maintenance, organizational affiliation, privacy control, and personal naming, the individual will adopt and use ndfSDpFDA syntax more.

We can use eBAY.com to illustrate this. If an eBay.com individual seller used his individually owned nD/FD as identity for eBay's web handles, he would pay his website hosting company $25 per month. Add then web content management time and costs. Using the ndfSDpFDA identities, the same $25 per month can provide magnitude times more subdomain names and subdomain web content hosting. The web content development and operational costs are shared among the numerous subdomain owners. The organization affiliated with the individual absorbs these costs and spread it among its users; hence, the costs per user can be magnitudes less. If the seller had many sales reps, each would carry his own ndfSD-pFDA associated with his organizational domain name. The ndfSDpFDA syntax will be much more popular because it is significantly less in price and time costs and more reflective of the individual-organization relationship.

IV. Exchange Interaction Between ndfSDpFDA and IWebs

IVa. Data Exchange Communications Methods Between http://ndfSDpFDA and IWeb A ndfSDpFDA is designed to be used with an IWeb, and their data communications methods need to be explained. HTTP is a stateless protocol. HTML is primarily a style language, dealing with the appearance of the information, and it doesn't have much exchangeable data field structure. As a result, programming techniques for data field transfers and for database manipulations can be complicated. We will discuss below the various means ndfSDpFDA data communicate with IWebs.

The methods of data communications between the IWebs and the ndfSDpFDA are important because these affect speed, reliability, and accessibility to data fields; hence, several options are presented. Each IWeb may want its own method of communicating with the ndfSDpFDA, so each communications pattern and the data received may be different. A ndfSDpFDAserver is a server that can generate ndfSDpFDAs.

IVb. Method #1 in Data Communications

One method of communicating between the ndfSDpFDA and IWebs is to use HTML comment tags "<!--comment-->", with the comments set as "data field descriptors". We can use business card information, from Table 1 below (Section IX), as an example. If an IWeb addresses ndfSDpFDA BobJones.CompanyA.com/biz, CompanyA.com's ndfSDpFDAserver responds by sending Bob Jones's contacts data attached with comments that serve as field descriptors— "contacts information data <!--its data field descriptor-->", as below:

```
Bob <!--FirstName-->
Jones <!--LastName-->
CompanyA <!--CompanyName-->
Accountant <!--Occupation-->
bobjones@companya.com <!--email-->.
```

IWeb's nURLv search and extract facility can search and manipulate on these types of contacts data. Comment fields are advantageous because the IWeb and browser can both address the same http://ndfSDpFDA, and the former receives and manipulates on the commentary data field descriptors and data, while the browser doesn't display the commentaries.

IVc. Method #2 in Data Communications

XML, unlike HTML above, is designed to facilitate data structures and searchable data. A more elegant, but perhaps more difficult to implement method, is that the addressed ndfSDFDA and IWeb search facility communicate through using extended markup language (XML), instead of the HTML commentaries above. XML can identify data types. For example, when a ndfSDpFDA request for BobJones.CompanyA.com/biz is made, the ndfSDpFDAserver can return XML like the following.

```
<PERSON>
<NAME>
<FIRST>Bob</FIRST>
<LAST>Jones</LAST>
</NAME>
<COMPANY>CompanyA</COMPANY>
<OCCUPATION>Accountant</OCCUPATION>
<EMAIL>bobjones@companyA.com</EMAIL>
</PERSON>
```

The IWeb search facility can now examine the "Occupation" field and determine whether it contains "Accountant".

IVd. Method #3 in Data Communications

Another standard to transfer data between ndfSDpFDA and IWeb search facility can be that the ndfSDpFDAservers will release only standardized data formats. For example, a standardized business card format with only First Name, Last Name, and Company information. The IWeb search facility will only search on these standards. Hence, if the various ndfSDpFDAs' HTML responses have identical formats, the receiving IWeb search facility can parse out the various contacts data fields.

IVe. Method #4 in Data Communications

It is possible that the IWeb software and all the ndfSDpFDAs that it uses originate on the same host. In these cases, the data communications between IWeb and ndfSDpFDAs would not require http. Various local database programming techniques can be used to transfer data between these.

V. Privacy Control pFD in Various nURLv, and Particularly in ndfSDpFDA

Sections Va-j below describe a pcsm system that enable layman to change his file directory name while retaining the original web content of a nURLv. Note in these the importance of an nURLv syntax form being a subset of another. For example, if a pcsm file suffix change will work for a nSDFS (name-subdomain-domain-file-suffix), it will also work for a ndfSDFDA, because the df and FD represent subset elements.

Va. The "p", Privacy Control System Module (pcsm)

The "p", privacy control system module, will be detailed below. Web administrators and programmers know how to change file directory names while retaining the original content, but, here, we are interested in a layman being able to accomplish this. In the design of the pFD, there needs to be layman-user-friendly ways of changing the file directory name while maintaining the same web content, ways of ensuring that the URL formed is a legitimate URL, and ways of changing the previously linked from the same ndfSDpFDA family.

Many problems can arise if laymen are allowed to create or revise file directories to be used in URLs.

1. Web server security and server administration problems may arise when laymen are allowed to create, delete, or redirect file directories.
2. The standard URL syntax requires certain characters that laymen are likely to err when creating file directories.
3. A FD-redirection mechanism may be more lax on the in-use URL syntax than standard URL syntax, but many browsers may not accept certain components of the more lax version, and laymen may not know how to test this.
4. The file directory web content may be database created, and changing the directory would be a very different and difficult process than simply moving files and creating directories.
5. The ndfSDpFDA is an entire individual representation, and changing the file directory may also involve affecting the subdomain.
6. The original FD may be linked from other webpages in the ndfSDpFDA.
7. If a web server redirection and aliasing mechanism is deployed, such as by Apache's mod_alias or mod_redirect modules, the problem still remains that laymen would have difficulties in using such a module.
8. The FD may already have a redirection.
9. The layman may not know the default file name.

The preferred nURLv embodiment (ndfSDpFDA) contains a pcsm. A pcsm consists of a private access point (e.g. password access) where the user can attain access to a FD change mechanism. This change mechanism consists of the user choosing a second FD name and associating the second FD addressing to the original FD's web content. Then, pcsm revises the original FD and its web content such that http addressing using the original nSDFD results in either a URL not found (an erasure of the original FD) or a URL redirection not to the second nSDFD.

If the original FD web content is a default file in a standard directory, then the above paragraph explains the pcsm process for this type of nSDFD content.

If the original FD web content is dynamically formed by a database, the pcsm still has the private access for the layman and then an easy process for attaching the second FD name to the original FD name's web content or process. As an example, the layman has a special password entry to a FD change process in the database. Here, he simply names the second FD and associates it to the original FD's action script that created the dynamic database web content. The database would take actions to create the second FD content using the original FD web process or content. Then the database would affect the addressing of the original FD's nSDFD such that it would result in either a URL not found or a URL redirection not to the second nSDFD.

If the original FD web content is formed involving a redirection, the pcsm still has the private access for the layman and then has an easy-to-use process for mapping the second FD name to the original FD name's redirected web content or process. As an example, the layman has a private password entry to a FD change process in the redirection mechanism. Here, he simply names the second FD and maps it to the original FD's redirected action script that created the original web content. The original FD's redirection mapping would be revised such that it would result in either a URL not found or a URL redirection not to the second nSDFD.

The pcsm has a "URL-name checking process" which checks the layman's inputted second FD name for the below possible URL errors and, if unacceptable, advises the layman to correct his second FD name. For example, the layman might make the following errors:
1. Placing extra "." In the file suffix.
2. Placing a "\" (from MSDOS) rather than a "/".
3. Placing an ending "/" and not realizing that many people would not use such a "/" when using the ndfSDpFDA.
4. Including "unsafe" characters, as described in Request For Comment 1738, by Tim Berner Lee and others "Uniform Resource Locators (URL)". These can include "space", unnecessary "." or "/", "#", graphical characters, and other.
http://www.w3.org/Addressing/rfc1738.txt
Additional possible laymen errors are:
1. Not copying across the index.html or other default file.
2. Not knowing the name of the web server's default file The pcsm can optionally update the original FD-URL links in the ndfSDpFDA's family pages to be the second FD-URL links. Pcsm updates by searching and replacing the original FD-URL links in the ndfSDpFDA family with the second FD-URL.

Search engines can index URLs, and it might be said that a ndfSDpFDA has little privacy because search engines will reveal FD information. There are several factors that reduce the risk of being found by search engine robots. Many http:// ndfSDpFDAs are not linked to other URLs on public, robot accessible (e.g. password protected) webpages, and a search engine robot find is difficult. In some cases, it is possible to place in the http://ndfSDpFDA webpage metatag instructions a request that the search engine robots not index the page, and most search engine robots will honor this request. Note still that the file directory change privacy control is inherently a low-level privacy device as it primarily relies on the formed URL not being found by inappropriate parties.

Vb. The VSAFS as a Type of SDFS

Prior Art

Figure 5:
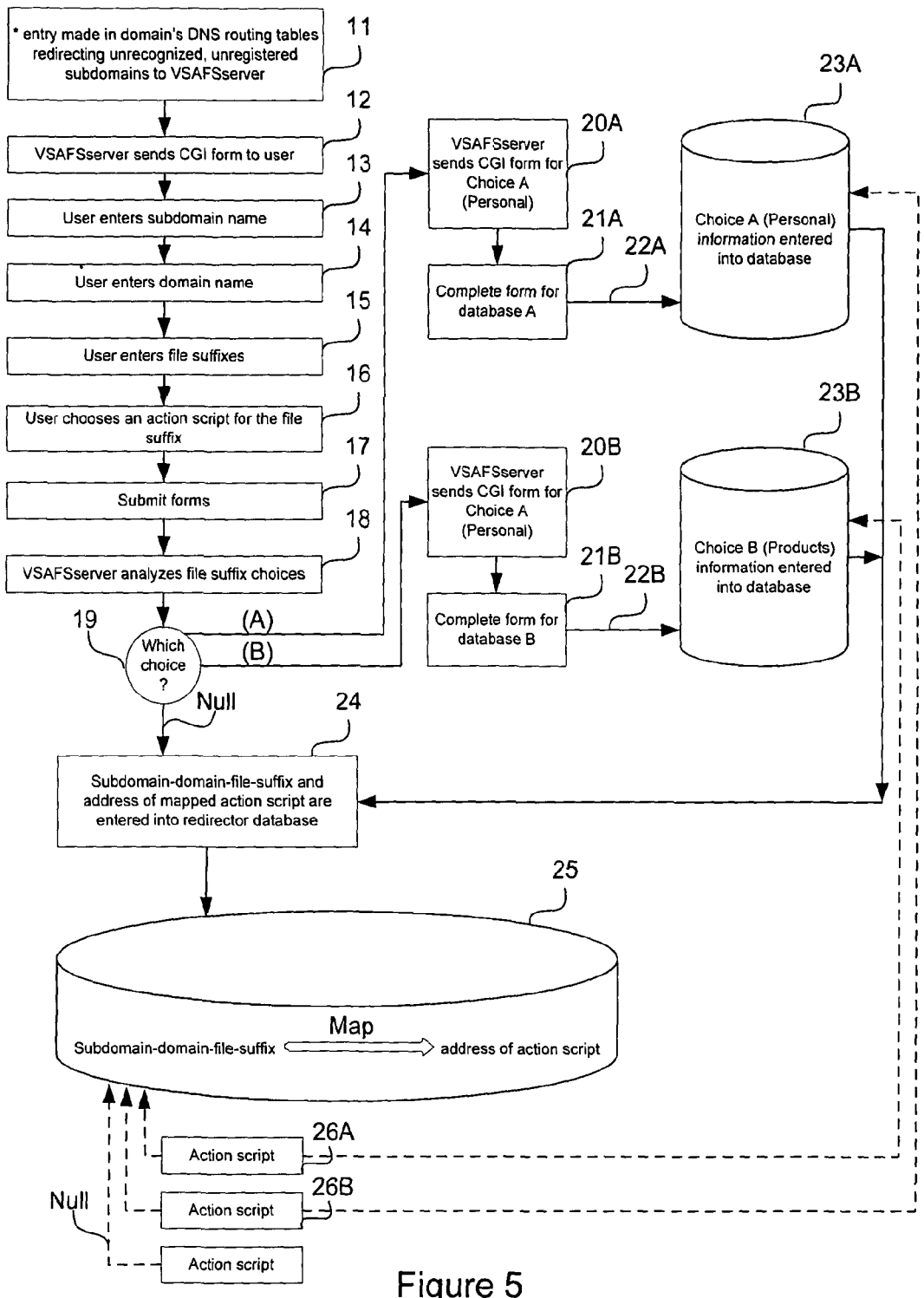
FIG. 5. shows a virtual subdomain address file suffix (VSAFS) (Prior Art) in accordance with one or more embodiments of the invention.
Figure 6:
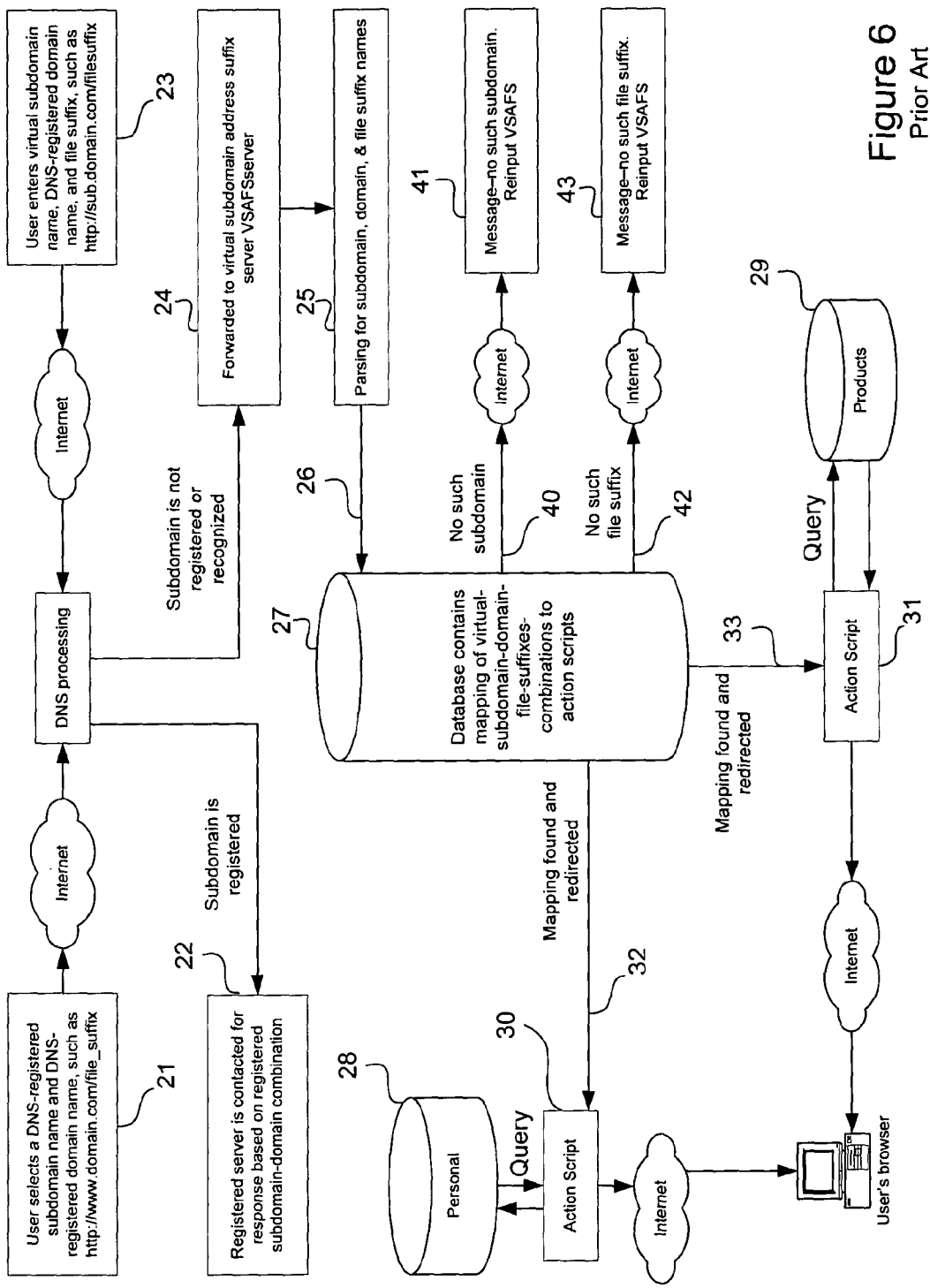
FIG. 6. shows a display of VSAFS in accordance with one or more embodiments of the invention.

Patent application Ser. No. 10/189,063, "Virtual Subdomain Address File Suffix" (VSAFS), filed Jul. 2, 2002 by Chen Sun shows a dfSDFS (ndfSDFD is a subset of dfSDFS). FIG. 5 is Ser. No. 10/189,063's FIG. 7 and explains how a VSAFS is formed. FIG. 6 is Ser. No. 10/189,063's FIG. 8 and shows how VSAFS are displayed. Full explanation of these figures is included in Ser. No. 10/189,063.

As shown in FIG. 5, a VSAFSserver sends a form to user (12), which the user fills out to request a SDFS combination (13-15). In this request, he chooses (16) an action script to associate with his file suffix. (19) to (23) is the process whereby the individual's chosen action script option determines which subsequent form is sent (20A or 20B) and which database is populated (23A or 23B). The special server (VSAFSserver) (20A & 20B) sends the user a form (21A or B) to use to populate database fields (23A or B), which will create the associated web content to the action script. Then the SDFS and its action script are mapped (24-26). Hence a SDFS combination is formed, and can be displayed, as FIG. 6 shows. Full details of how a VSAFS is created and displayed are explained in patent application Ser. No. 10/189,063.

A little more about the VSAFS, as it relates to ndfSDFDA. By applying a rule that the subdomain of a VSAFS is a name or representation of a name, nVSAFS is a nSDFS. A VSAFS automatically has data fields, so a nVSAFS is also a ndfSDFS. Because a VSAFS uses redirections in its file suffix, it is easy to use only file directory names for the file suffix (by redirecting the file directory name to an actual file name), thus forming a ndfSDFD. And in the below section, we will see a privacy module added, creating a ndfSDpFD using these VSAFS. The ndfSDpFDA is also created, since a VSAFS, as shown in FIG. 5, has a null file suffix option (19), which creates a VSA, which can become a ndfSD. U.S. Pat. No. 6,442,602 and patent application Ser. Nos. 09/642,127, 09/853,167 by Chen Sun and Azkar Choudhry explain how VSA are created.

Vc. pFD Embodiment VSAFS with FS Change Process

Figure 7:
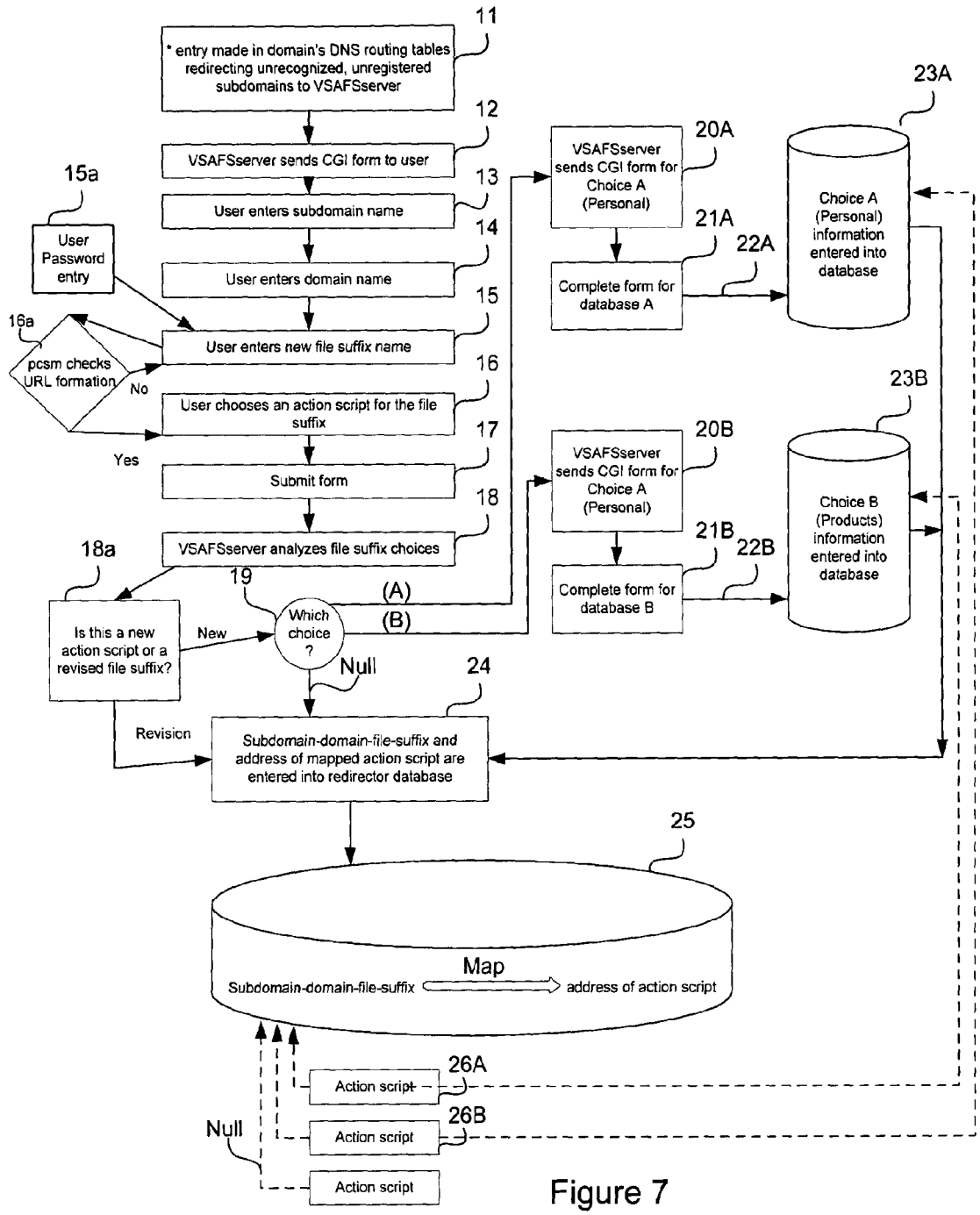
FIGS. 7.-11. show privacy control system module examples in accordance with one or more embodiments of the invention.

A process for a SDpFS is shown in FIG. 7, where steps 15a, 16a and 18a have been added to FIG. 5. Having already set up a VSAFS, the individual can now reenter at step 15a through using a password. Individual then proceeds through steps 15, 16a, and 16, keeping the original action script, but changing the file suffix name. A pcsm check is made on correct FD-URL formation (including URL syntax) of this name (16a). If the URL and other pcsm checks are accepted, the process continues to step 16, 17, and 18. If not, the user is asked to choose another file suffix name at step 15. In step 18a, the system determines whether a new action script has been requested, and if so, to inquire for more database information by proceeding through 19 to 23. If no new action script has been requested, and the file suffix is a revision, then the file suffix name will change by continuing to steps 24 and 25. Step 25 would map the new file suffix name to the original file suffix's action script of the VSAFS.

For example, http://Joe.GM.com/56kje26 originally displays a webpage titled "JoePrivateInfo" (created from step 23A of FIG. 5). Using this embodiment of FIG. 7, Joe can change this file suffix to "79dfjk34", and http://Joe.GM.com/79dfjk34 would then subsequently display the same identical webpage "JoePrivateInfo", thereby achieving a degree of privacy control through pFD-URL change.

Notice that we could have also placed the password entry point instead at step 13 instead of step 15 and allowed the individual to change his subdomain name. Though this is possible, it is not preferred for sociological reasons, rather than technical reasons. Socially, it is preferred that the individual not change his identity and organizational affiliation much (just as one would not change their birth name often). However, if password reentry is at step 13, technically this can happen.

In this embodiment, the redirection mechanism enables the redirector to quickly and easily change the URLv file suffix to another name. This is done by remapping the file suffix. Because using the redirection mechanism does not have to comply with URL standard syntax, the redirection mechanism can be looser in syntax. But the pcsm still should check the layman's input. The layman user now has a SDpFS with a degree of privacy achieved through URL file suffix control—a VSApFS.

For the same reasons as explained in the section above that a nVSAFS creates a type of ndfSDFD, in this section, the nVSApFS creates a type of ndfSDpFD.

Vd. pFD Embodiment Using Standard Subdomain and Redirector Database

Unlike the virtual subdomains above, the standard subdomain is a subdomain whose name is registered and recognized in the domain's DNS table. Standard subdomains are usually not changeable by layman users because this typically requires giving the user access to DNS tables, which means that the layman can damage the domain's settings. The process of adding and changing file suffixes is also usually not accessible to layman users and instead is accessible to web programmers and administrators.

Figure 8:
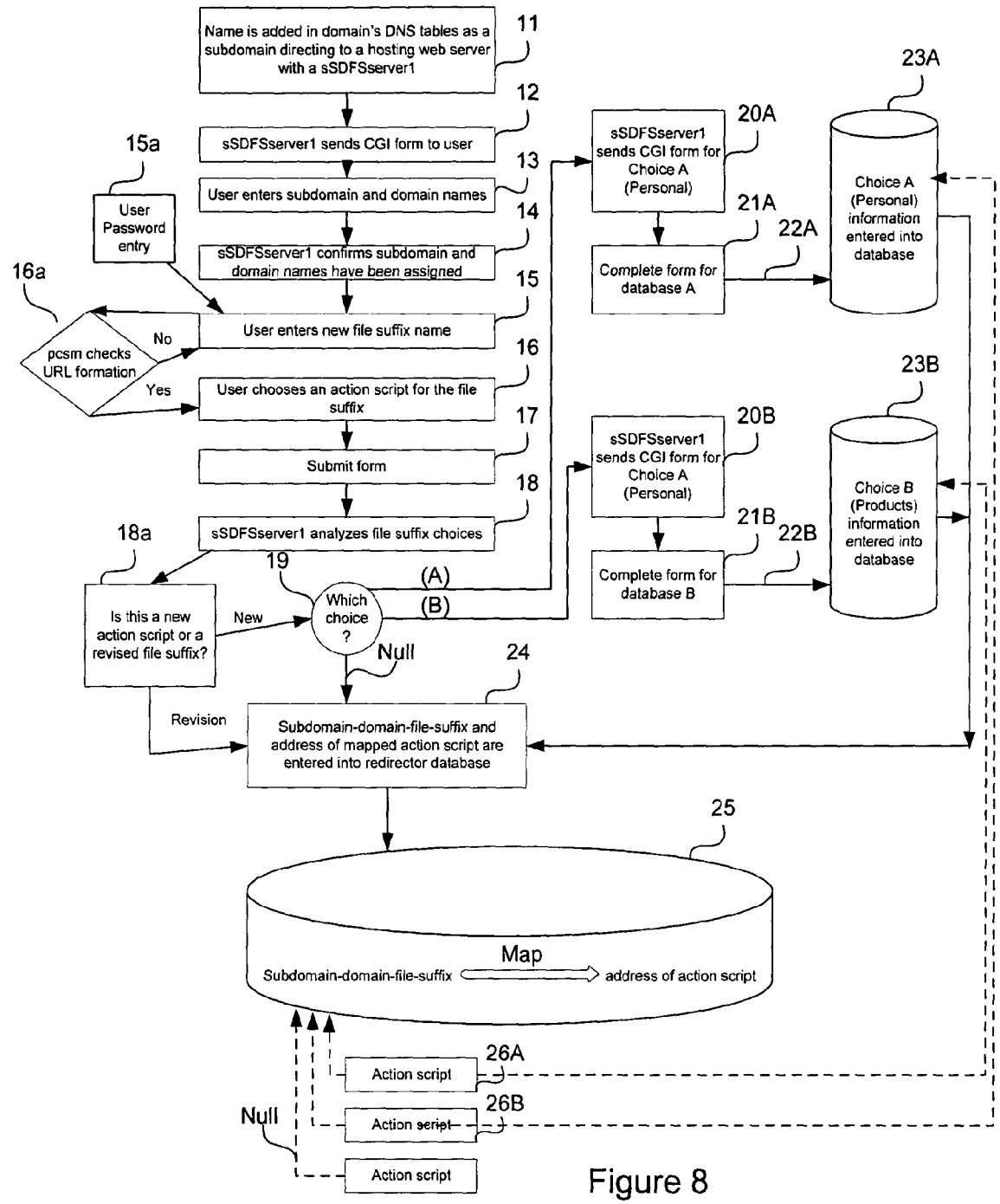

In this embodiment, as shown in FIG. 8, the subdomain name is listed in the domain's DNS subdomain table (11). This subdomain points to a sSDFSserver (the first "s" is for standard—standard-Subdomain-Domain-File-Suffix-server) which parses the HTTP 1.1 sSDFS URL calls to determine the standard subdomain, domain, and file suffix names, and then maps the file suffix to the chosen action script.

FIGS. 7 and 8's creation and change of their respective SDpFS are similar, both using action scripts with associated file suffixes to set up a redirection database (25). The initial differences are in steps 11 and 14. In FIG. 8's step 11, the subdomain is in the domain's DNS tables (typically placed by an administrator instead of a user because of the complexity and security involved in DNS changes). In step 14, the sSDFSserver1 checks to make sure that the user's entered subdomain and domain have been registered before proceeding and then allowing for file suffix entries.

For pcsm, FIG. 8's steps 15a, 16a, and 18a shows how the user can change his mapping of file suffix names to action scripts. First, a layman reenters at step 15a with a password and enters a new file name. A pcsm check is made on the correct syntax (including URL syntax) of this new file name (16a). If the URL syntax and other pcsm checks are accepted, the process continues to step 16. If not, the user is asked to choose another file suffix name at step 15. If accepted, the sSDFSserver1 then maps (25) the second file suffix and eliminates the original file suffix. The layman user now has a SDpFS with a degree of privacy achieved through URL file suffix control.

Figure 9:
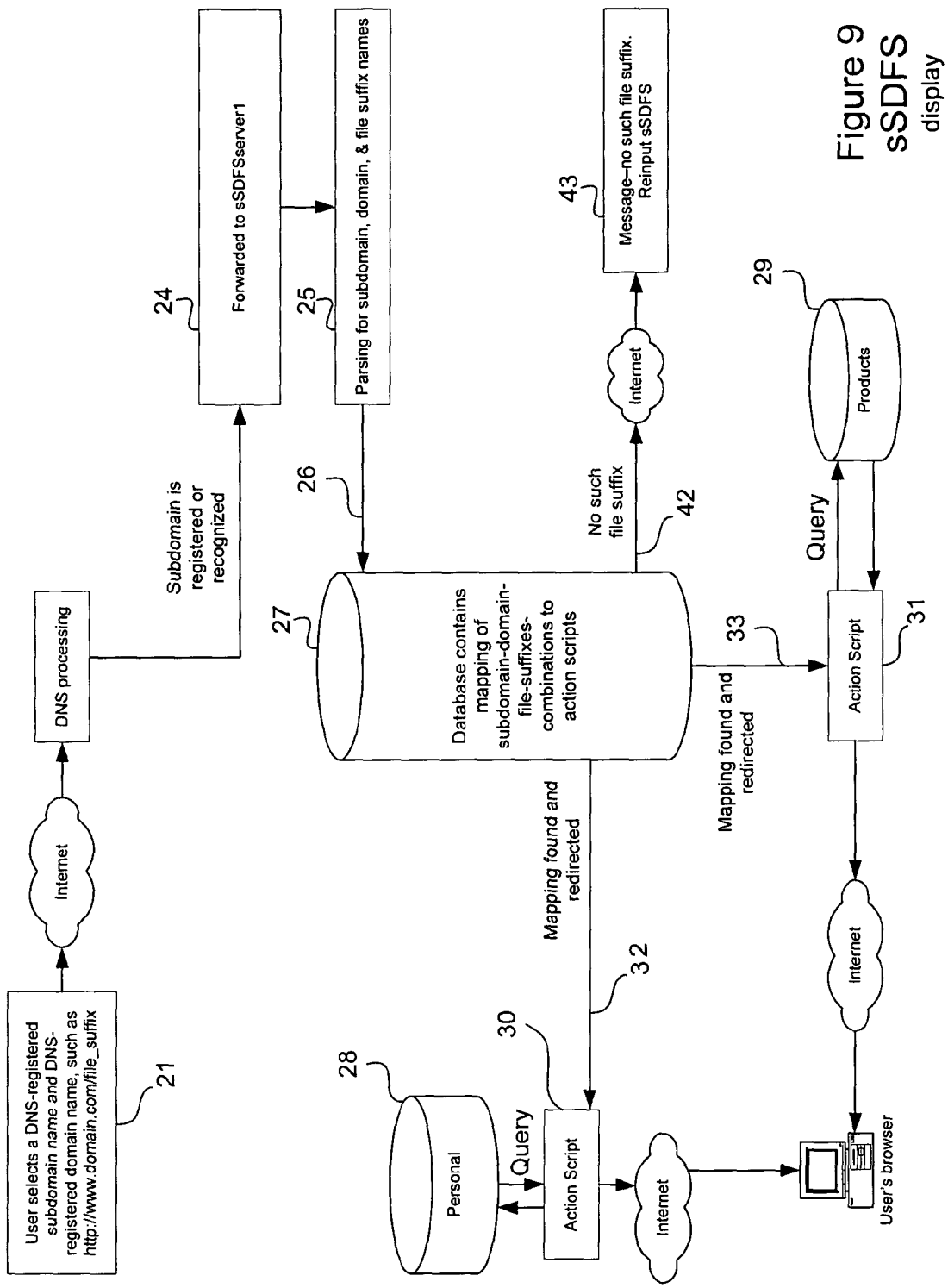

FIG. 9 (similar to FIG. 6) shows how this embodiment's SDpFS would be displayed. After the DNS processing and forwarding (24) by the standard subdomain, the URL call is parsed (25), and the sSDFSserver1 and the redirection database (27) then maps the file suffix to an action script (32, 33), and this action script call upon previously stored database information (28, 29) to return through the Internet the SDpFS information.

Again, an SDpFS embodiment is shown, where a layman individual can change the file suffix and retain his original web content, thus using URL file suffix changes to secure a degree of privacy. A nSDpFD is a subset of a SDpFS. And since this embodiment has a database field that can form "df"s, this embodiment can also form a ndfSDpFD, and subsequently ndfSDpFDA, the preferred nURLv.

Ve. pFD Embodiment (SDFD) with Standard File Directory FD, with Standard Subdomain, without Redirector Database When a browser issues a URL call without a file name in a directory, then the web server typically returns a preset-named default file, typically index.html, in the directory. Hence, if a browser made a http:// call—"Joe.GM.com/cars" or "Joe.GM.com/cars/", "Joe.GM.com/cars/index.html" is then displayed. If index.html is not within the "cars" directory, an error condition may result or directory structure shown.

URLs with file names are longer and more difficult to communicate, particularly verbally, than URLs with only file directory names. For example, "Name.Domain/Directory" is easier and shorter to communicate than "Name.Domain/Directory/FileName.html". Furthermore, a URLv with FD/ is more difficult to communicate, particularly verbally, than a FD, which is why FD is preferred.

In the redirection URLv embodiments above, file suffixes can be solely file directories because these embodiments' redirection databases allow for redirection of a file directory name to a specific file name. However, in order to use solely file directories in a standard, non-redirected file directory the default file should be within the directory A redirector database allows for a SDpFS because the redirection is changeable. A standard, non-redirected file directory is not easily layman changeable, and cannot act by itself as a SDpFD. However, an add-on process can allow for a standard file directory to change while maintaining the same content.

Figure 10:
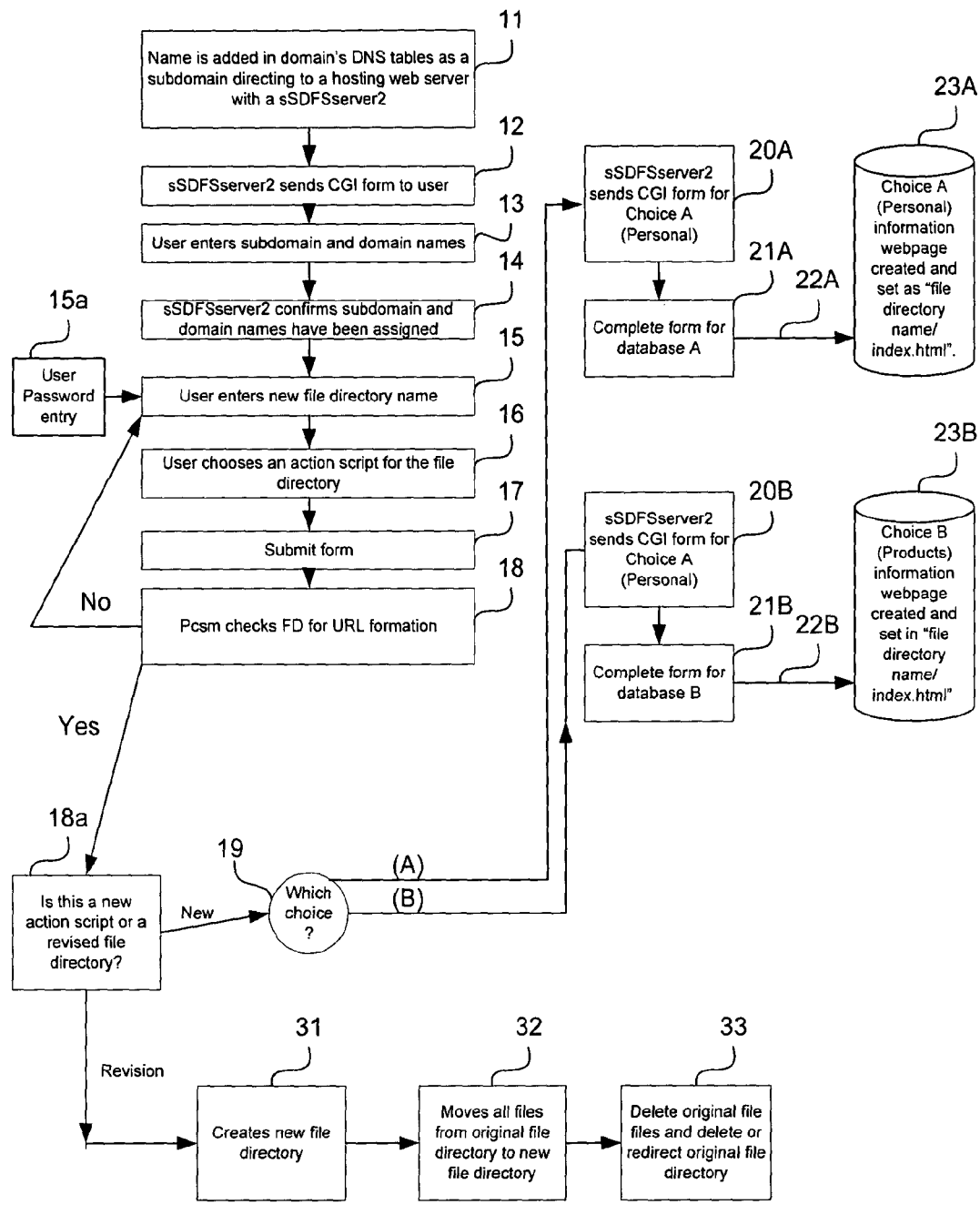

FIG. 10 (mostly derived from FIG. 8) shows this embodiment. Here, typically, the domain administrator adds the desired subdomain name to the domain's DNS table and directs this subdomain to a hosting sSDFSserver2 (11). This sSDFSserver2 works differently than sSDFSserver1 of FIG. 8. sSDFSserver2 sends a CGI form to the user, and the user enters the desired subdomain and domain. To form an initial SDFD, the user then chooses a file directory name (15). User then chooses an action script for the file directory (16), and then submits the form (17).

On step 18, the sSDFSserver2 analyzes the user requested SDFD differently than the above redirector embodiments' servers' analyses. Because sSDFSserver2 will create a file directory based on the file directory name, pcsm has to ensure that the user's requested file directory name will form appropriate web server and URL syntax.

After analyzing the user's proposed file directory and assuring it is URL-syntax and web server acceptable, the sSDFSserver2 then sends an action-script-defined CGI form to the user (20A or B), that the user completes (21A or B), and from here, the sSDFSserver2 would create a file directory with the user-submitted file directory name and place an index.html (default file) in this directory. The web content of this index.html is created by the user's selected action script's actions (19 & 23A or 23B). Patent application Ser. No. 10/189,063 explains steps 19 to 23 thoroughly, as can be seen in FIG. 5 (prior art).

To changes a FD name, the layman user can reenter with a password in through step 15A. The user then selects a second file directory name (15) and chooses the original action script (16). Pcsm URL and web server check is made (18). In step (18A), the sSDFSserver2 detects whether the action script had been previously used, and if so, the sSDFSserver2 creates the second file suffix directory (31) and moves content from the original file suffix directory into the second (32), and erases or redirects the original file suffix directory (33).

Through the above embodiment, the layman user again gains a mechanism to quickly establish a SDpFD and change his file directory while retaining the same content. Thus, the user gains a SDpFD with privacy made through FD-URL control.

A nSDpFD is a subset of SDpFD. By creating the FD default files as having data fields, a ndfSDpFD is formed.

Vf. pFS Embodiment of nSDFS, without Redirector Database, and with Standard Subdomain This embodiment is similar to immediately above, except that the file name is included in the file suffix. In this embodiment, for step 15 of FIG. 10, the user is requested for file suffix that includes a file name, and this file name is used instead of index.html (default file) in the file-suffix-named directory (23A & B). This embodiment is weak in verbal communications because it lengthens the URL, but technically it resembles the immediately above.

Vg. pFD Embodiment of Dynamic Web Database Creating Web Content Based on File Suffix and File Directory In these dynamic web database cases, a web database and web server generally will parse the file suffix portion of a HTTP 1.1 URL call that has a nSDFS or nSDFD, and use the parsed nSD and parsed FS or FD to cause a database action that generates and returns web content specific to the nSD and FS or FD. Each web database is designed and works differently, and so the processes are different.

For changing the FD, the web database and server will either generate the same web content for a second FD or remap the second FD to the original web content. To change his FD, the layman user accesses a private entry to the area with the FD change module for the nSD involved. He then receives a form requesting the second FD name and the original FD name or original web content generation process name. He completes and submits the form to the web database. The web database then either remaps using the second FD to map to the original FD web content or regenerates the original web content using the second FD. Finally the database automatically deletes or remaps the original FD. Again, the pcsm needs to check the layman user for the viability of the URL formed.

Again, an SDpFD embodiment is explained, where a layman individual can change the file directory name and retain his original web content, thus using URL changes to secure a degree of privacy. A ndfSDpFD is a subset of SDpFD. The data fields in the ndfSDpFDA will be supplied by the database.

Vh. pFD in SDpFD Embodiment

Without Redirector, without Webpage-Creating-Database, with Standard Subdomain and with Standard File Directory In the above nURLv embodiments, a database generated the display webpage file (e.g. FIG. 7-23A & B) and placed it in the file directory specified by the user.

Though preferred, such a webpage-creating database is not required, as other mechanisms can place the display webpage file into the file directory. For instance, an administrator can program a webpage-display file and move it into the original file suffix directory.

Figure 11:
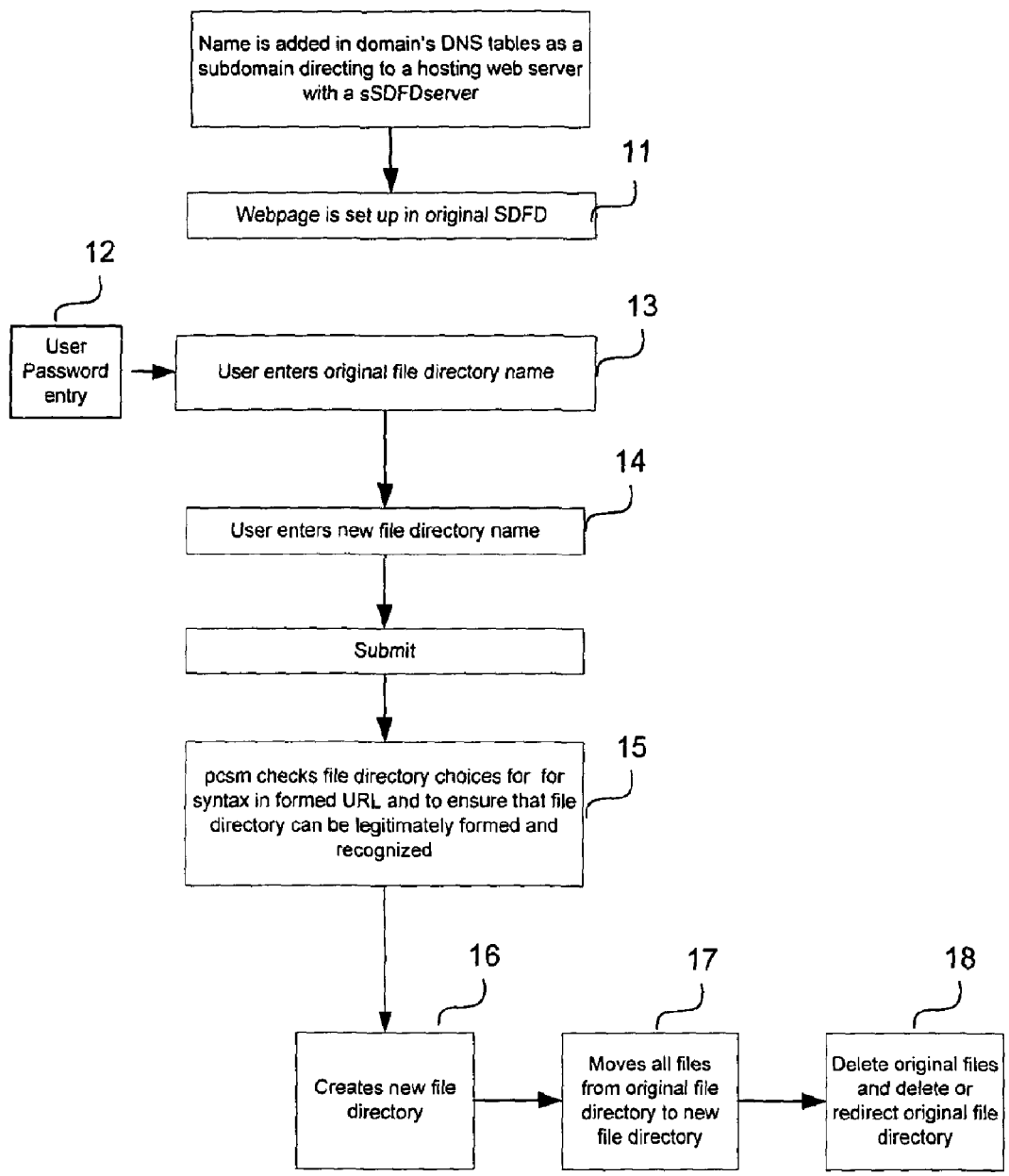

FIG. 11 shows a pcsm to create pFD working with this type of nSDFD. The original webpage information with a default file name has already been placed into an addressable SDFD (11). The user enters a password (12) to gain access into the file directory change process. He enters in the original file directory name (13) and then enters the second file directory name (14). The pcsm checks the second file directory name for URL form (including URL syntax) (15). Once the second file directory name is accepted, the process then creates a new directory (16) with the second file directory name, moves (17) all files from the original file directory to the second file directory and erases (18) (or redirects) the original file directory and files. A nSDpFD is formed by pcsm. By adding data fields to the original webpage content, a ndfSDpFD is formed.

Vi. Layman-Usable Criteria of pcsm

Pcsm should be simple for a layman to use. UNIX and Lynx commands to accomplish the above are usually error-prone because laymen are involved, and giving layman users access to a type command environment is also error-prone. For example, requiring the users to recall and use a "ren" command would be unacceptable, because many laymen would incorrectly execute the command.

A graphical folders system for renaming file directories will be acceptable, provided that the users can have private access only to their directories on the web server, be given directory names they are allowed to affect, and then be able to rename the directory name using click and rename, much like using a Microsoft Windows Explorer tool. A pcsm check still should be made. Checks should be made that the layman does not affect directory names or files that he or she should not affect. The original FD's links in the ndfSDpFDA family can be automatically renamed and linked to the second FD.

Vj. pFD Embodiments Using Other Techniques

As URL web content can be created using numerous other prior-art programming methods, it is difficult to enumerate all the cases where pcsm can be used. The important factors are that the layman has a private browser access to his ndfSDpFDA FD change process, locate file directory names that can be changed, easily change the file directory name, have the formed URL formed checked out for correctness, ensure that the layman doesn't inappropriately affect files, server settings, DNS settings, ensure that the original FD doesn't display the original content, and with the final result that the second FD displays the original webpage content.

Vk. Automatically Replacing the FD Links in the nSDFDA Family

As mentioned above, when an original FD changes, pcsm can also change all the nSDFDA family members that had linked to the original FD to now having links to the second FD. Pcsm accomplishes this by searching for the original nSDFD link in the nSDFDA family and replacing it with the second nSDFD.

VI. nSD with Public Communications Channel, Spam Control, and Public Encryption An individual representation system should have a way of public communications. Many people use SMTP and POP email with the public addressing syntax of "name@adomain.com" for their means of public Internet communications. However, such email systems are being inundated with email spam. An Internet-based individual identity and representation system, as this invention is, should have a spam-resistant email system.

A preferred component of this invention is that a http://nSD provides a public channel of communications to the individual. For example, http://Joe.GM.com has a webpage-userinput-box for email communications (a webpage form email), as can be seen on FIG. 4, item (7). An advantage of using http://nSD to include the public channel of communications is that the nSD syntax resembles the popular name@adomain.com SMTP email addressing syntax. When an individual issues his communications channel by using his nSD, (whether issued using a paper business card, verbally or through the Internet), there is less explanation required by the issuer as to the novelty or usage of this web based contact method. For example, Chen.WebAndNet.com is very similar to Chen@WebAndNet.com.

This public channel of communications at nSD is also valuable to the ndfSDpFDA family in as follows. As seen above, Joe of GM.com has numerous profiles, and his FDs can change and be eliminated; for example, Joe.GM.com/sedans can be changed to Joe.GM.com/Chevysedans, and Joe.GM.com/sedans be eliminated. To locate Joe's sedans again, a Joe.GM.com/sedans inquirer can http address Joe.GM.com to webpage-form email Joe to request the new ndfSDpFDA for Joe's sedans. Likewise, if Joe.GM.com/56kje26 was changed, his prior special customers can contact through Joe.GM.com's webpage-form email, and ask Joe for where the special deals link is.

The http://nSD's web content for spam-resistant public communications channel can include telephone number, postal addresses, and Internet-based spam-resistant techniques, such as an user's reading and confirming graphically generated word images before receiving clearance to submit form email. However, spam-prone name@adomain.com email address syntax should be avoided on this nSD, unless the "name@adomain.com" email address accompanies spam-resistant controls.

Perhaps the easiest spam-resistant communication channel is to use webpage-form email that forwards the message to the named Individual. Webpage-form email is as its name describes—an example being a webpage's rectangular user-type-input-form boxes in which the typed content is then forwarded, seen commonly on the "Contact Us" webpage of domain websites. The sender calls up the URL with the webpage-form email, types his message in the input-box, perhaps clicks a few checkboxes associated with the webpage's questions, and clicks a "submit" or "send" button. The message is then sent to the web server, which processes URL call and its email message, and then forwards the message to the intended recipient. Other examples of webpage form email are rectangular-user-input-boxes of browser-outbound-mail such as in Yahoo! Mail. Frequently, webpage-form email has additional required form inputs, such as clicking check boxes, putting in reply email address, and/or pull down options in drop-down-menu boxes. The message and any additional user inputs are then sent for web server processing that subsequently forwards the message to the intended recipient. This is prior art, and a sample of one is seen in FIG. 4 (3 & 7).

Webpage-form email can be spam resistant because simple changes can be made to its form resulting such that sending spam becomes economically more expensive. For example, domain A's webpage form email for its individuals may require that 2 check boxes be checked off before forwarding the mail. Domain B may check that a legitimate reply email address (one that doesn't bounce back after sending) be filled in a form box before forwarding the message to the recipient. Domain C may require the user reading and entry of a graphical image containing text before accepting the form email. Domain D may require 3 check boxes. The spammer can obviously circumvent each of these various barriers; however, his economics of sending the spam increase exponentially as he encounters many different domains with differing webpage form-based email reception requirements for the domains' individuals.

Email spamming using name@adomain.com addressing syntax is low cost because it is easy and fast to send out bulk email to millions of differently addressed name@adomain.com syntax addresses. To send to each webpage form email, the spammer has to pull in each individual's URL, wait for it to download, and then complete and submit each webpage-form email with its additional required user inputs. The spammer's problem is these webpage-form email processes are very slow and resource consuming activities (compared to bulk-mail addressing using the popular name@adomain.com syntax)—significantly raising the bandwidth costs of the spammer. Also, because it is slow, the spammer can be quickly detected.

Yet, the speed of webpage-form email download and send is very suitable for humans to personally type and send emails. Since the nSD's web content can contain webpage form email, and nSD can be easily verbally communicated and resembles name@adomain.com syntax, the nSD can also serve well as the spam-resistant public communications system address.

As email is frequently used, it will be valuable that the preferred public communications channel address (nSD) be quickly created for use. Standard subdomains are slow to create and suffer from DNS propagation delays. Virtual subdomains can be created quickly and don't suffer from DNS propagation delays, as explained in U.S. Pat. No. 6,442,602 by Azkar Choudhry, and patent application Ser. Nos. 09/642,127 and 09/853,167 by Chen Sun and Azkar Choudhry. Patent application Ser. No. 09/853,167 also shows how business card format web content can be database generated for addressed nSDs. Prior-art programming routines can add a webpage form email on each of these virtual subdomain nSD webpages with additional checkboxes and thus creates a spam-resistant public communications channel and web address for the ndfSDpFDA family.

Additionally, http://nSD may include a downloadable public encryption key, providing a convenient and easy-to-remember address and method to attain the key for data encryption.

VII. Searchable Index of nSDs with Spam Control Public Communication Channel

Present website means of displaying an organization's personnel and contact method is typically listing on a webpage the person's name and title, and including their name@adomain.com syntax email address. Web robots can read these web pages and collect email addresses with the syntax name@adomain.com from these webpages, enabling spammers to conduct bulk mailings.

As explained in patent application Ser. No. 09/853,167, virtual subdomains can also form a searchable index of nSDs. Likewise, we can see from the database designs in FIGS. 5, 7, 8, 9, 10, and 12 as well as in patent application Ser. No. 10/189,063 by Chen Sun, that database generated webpages of nSDFDAs can be formed. These nSDFDA databases contain the web content of nSD and ndfSDpFDA. Using their query and search capabilities, these web databases can also form searchable indexes of ndfSDs' and ndfSDpFDAs' web content. For example, people's names, titles, job functions, locations, and other ndfSDpFDA content can be searched. Patent application Ser. Nos. 09/853,167 and 10/189,063 additionally show how such an index can form a searchable personnel directory for the domain's associated individuals.

In the present invention, the nSDs of such searchable ndfSDpFDA indexes contain section VI's public communications channel, so when the individual is searched for and found, the user can communicate with this individual, though this public communications channel. This channel is frequently a webpage form email. For example, users can quickly find someone in an organization by searching a web index of the organization's domain-name-associated-personnel (index of ndfSDpFDAs), pull up the personnel individual's nSD webpage, and then use the individual's nSD's spam-resistant webpage form email to contact him. The effect will be a searchable, communicable web index of a group of people associated with a domain.

VIII. Web and ndfSDpFDA Overview

Figure 12:
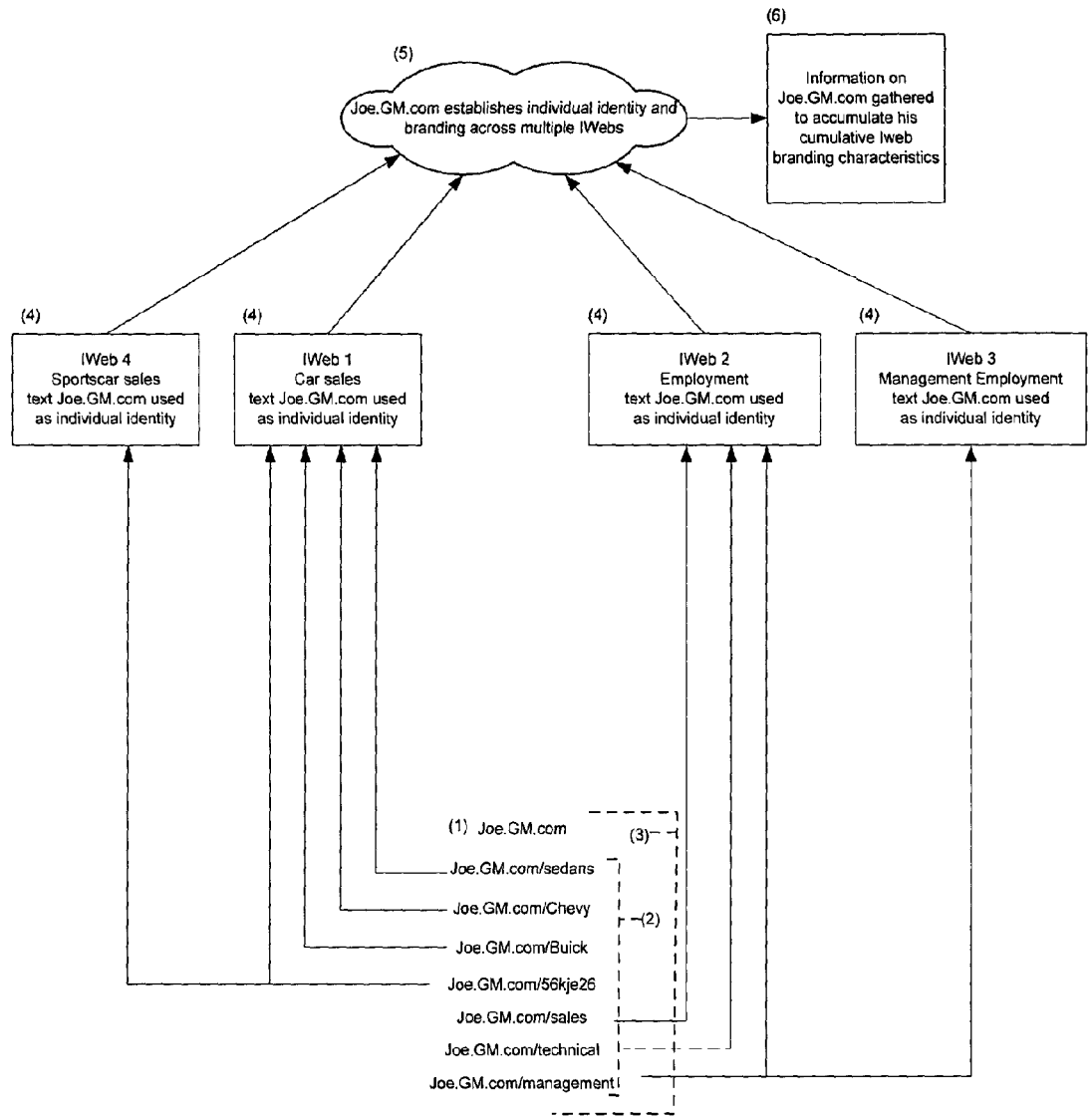
FIG. 12. shows a second overview of the invention in accordance with one or more embodiments of the invention.

FIG. 12 is a second overview of the invention's overall system design. It first uses a ndfSDpFDA family (3) which is comprised of a ndfSD (1), and ndfSDpFDs (2). The ndfSDpFDA can enter into IWebs (4), which use and manipulate the data fields of the http://ndfSDpFDA to conduct Individual exchanges processes. The IWebs use the text of the nSD as the individual identity (5). Various IWebs can consolidate their collected information on a nSD-text-as-identity to form branding characteristics for individuals and domains (6).

A hWeb is a prior-art type of website where individuals exchange and share information with other individuals and this information may lead to other kinds of exchanging. Examples of hWeb software include the software for eBAY.com, Matchmaker.com, employment websites, and Ultimate Bulletin board discussion forum, which are all known prior arts. The individuals' representations in hWeb software sites include web handle names, email addresses, and account names.

IWeb are individual exchange software and sites in which its individuals' representation is a nURLv, preferably ndfSDpFDA. And, as explained in the data communications section above, an IWeb can search on and extract the web content of an addressed ndfSDpFDA. We'll show below how ndfSDpFDA, being IWeb's preferred individual representation, offers advantages over the individual representation forms in hWeb software and sites.

IX. IWeb & ndfSDpFDA Embodiment

Contact Manager, IWebContacts

In this section, we will show an IWeb-ndfSDpFDA interaction and embodiment—a contact manager called IWebContacts.

IXa. History of Contacts Managers

Contacts management deals with the storage and retrieval of people's contacts information. Historically, business card holders and address books served this purpose. The onset of computers brought forth databases specifically designed for contacts management, such as ACT, which can be acquired from Symantec Corp., Outlook from Microsoft, and Goldmine from FrontRange Solutions. These non-web-based contacts managers typically contain fields including individual's name, some method of contacting the individual, such as his/her address, telephone number, fax number, the organization he/she represents, and title. Other data fields can include associated office personnel (e.g. assistant's name), birthday, communications activities with the individual, plan of action, digital certificates, IDs, billing information, attachments, hobbies, fields suitable for specific industries, and user defined fields. These non-web-based computer contacts managers automate many of the search and retrieval functions over using paper-based business cards and indexes.

The entry, exchange, update, and graphics requirements of contacts information remain cumbersome for these non-web-based computer contacts managers. The contacts information received by the recipient do not automatically update when the sender's contacts information changes (dynamic updating); entry is typically accomplished by typing; card scanners are time-consuming, inaccurate, and costly; graphics are difficult to handle.

Furthermore a non-web-based computer contacts manager's channels of communications and exchange are usually limited to a few—e.g. only data communications. Channels of contacts information communications and exchange can include data communications, email, face-to-face oral, telephony, data import/export, handwriting, and print exchanges.

vCard (from Internet Mail Consortium) a standard using data communications for relaying information among non-web-based contacts managers lacks verbal and written exchange capabilities, wide and extensive usage, extensive graphics, and dynamic updating.

As a result, most contacts information exchange continues to be relayed by telephone (verbally), postal mail (paper business card), or face-to-face exchange (paper business card), and the collected contacts information are then manually typed into a non-web-based contacts manager.

Web-based contacts managers have graphical contacts information and dynamic updating, with websites such as Netscape's Net Business Card. In these, the representation of an individual contacts is using a complicated file suffix in the respective website's domain name and the individual's name is behind the domain name. For example, suppose John Smith of Ford Motors (Ford.com) wanted to use a Netscape card. He would receive an URL like Netscape.com/~d35k/256/JohnSmith, a URL that Ford Motors is unlikely to approve of. Other web-based contacts manager websites require an individual to use the contacts manager's domain name plus using assigned codes.

U.S. Pat. No. 6,442,602 and patent application Ser. Nos. 09/642,127, and 09/853,167, filed by Chen Sun and Azkar Choudhry, showed how to build sets of web business cards with people's names in front of an associated domain name, using a technology called virtual subdomain addresses. For example, in the URL JohnSmith.Ford.com, "JohnSmith" is the subdomain name and Ford.com is the domain name.

These patent and patent applications also contained the computer program code to add web business cards to any number domain name. More importantly, the applications explained how any domain name can use a remote server (for example, one administered by an outside service) to add such subdomains to an existing domain name. Hence, Ford.com and USPTO.gov can easily provide all its employees virtual subdomain address (VSA) business cards, using the technologies described in the above-mentioned patent applications.

Patent application Ser. No. 10/074,081 "Contacts Management Using Virtual Subdomains" by Chen Sun explains a contacts manager invention that utilizes virtual subdomains coupled to domain names. Here a contact manager is built using individuals' identities having the syntax "Name.Domain" and using http://nSD addressing of this syntax to search, store, and retrieve individuals' contacts data.

People though desire privacy. A Name.Domain combination placed into a contacts manager lacks a degree of privacy, as all web information of the named individual is easily public, once the person's name and his organization's domain are known. There thus arises a need for a contacts manager that can utilize nURL addressing and can accommodate a person's privacy needs.

IXb. Sample Data Used in the Contacts Manager

To explain this IWeb embodiment, eight ndfSDpFDAs with associated contacts data are listed in Table 1. In prior-art contact managers, a single individual typically has a single URLv field, usually for the individual's organization's www.adomain.com's URL. However, as can be seen in Table 1, an IWeb contact manager has to accommodate several nURLv profiles per individual.

TABLE 1

Examples of ndfSDpFDAs with Associated Contacts data

| Stored ndfSDpFDA (nURLv) | Contacts data Organization | Contacts data First Name | Contacts data Last Name | Contacts data Occupation | Contacts Information Contact |
|---|---|---|---|---|---|
| BobJones.CompanyA.com | Company A | Bob | Jones | Employee | browser mail form |
| BobJones.CompanyA.com/biz | Company A | Bob | Jones | Accountant | bob@companya.com |
| BobJones.CompanyA.com/fun | Company A | Bob | Jones | Golf | bob@personalmail.com |
| Mary.CompanyA.com | Company A | Mary | Jones | Lawyer | Telephone number |
| Bob.FirmB.com | Firm B | Robert | Johnson | Partner | Browser mail form |
| Bob.FirmB.com/accountant | Firm B | Bob | Johnson | Accountant | bob@firmB.com |
| Bob.OrganizationC.org | Organization C | Bob | Roth | Preacher | Tele |
| Bob.OrganizationC.org/life | Organization C | Bob | Roth | | Bob@organizationC.org |

IXc. Prioritization and Consolidation of ndfSDpFDA Data Field Information in IWeb Understand that IWeb, as it is capable of using multiple profiles of an individual, would sometimes receive different information on the same data field of the same individual. Notice in Table 1 that Bob.FirmB.com has "Robert" in the first-name data field and Bob.FirmB.com/accountant, has "Bob" in the first-name data field, though these are the same individual. In order to data manipulate, store, and present data field information efficiently, the IWeb action should give higher priority to one profile's name. In this sample case, if Bob.FirmB.com has priority over Bob.FirmB.com/fun, "Robert" will have priority over "Bob".

An IWeb can also consolidate the various redundant information, again to save storage space, expedite processing, and facilitate user's ease of viewing. Table 2 shows the result of an IWeb action that has extracted from Table 1 data fields—Organization, First name, Last name, and ndfSDpFDA names—and prioritized and consolidated the redundant extracted field information. Notice that it is easier to read, shorter, and saves storage space.

TABLE 2

Extracted ndfSDpFDA prioritized and consolidated

| Contacts data Organization | Contacts data First Name | Contacts data Last Name | Stored ndfSDpFDA |
|---|---|---|---|
| Company A | Bob | Jones | BobJones.CompanyA.com, BobJones.CompanyA.com/biz, BobJones.CompanyA.com/fun |
| Company A | Mary | Jones | Mary.CompanyA.com |
| Firm B | Robert | Johnson | Bob.FirmB.com, Bob.FirmB.com/accountant |
| Organization C | Bob | Roth | Bob.OrganizationC.org Bob.OrganizationC.org/life |

The IWeb can, of course, have the redundant information unconsolidated, in which case, each ndfSDpFDA would be a database record. In the consolidated form, each individual may have several ndfSDpFDAs. Tables 1, 6, and 8 are unconsolidated, and Table 2 is extracted, prioritized, and consolidated. These consolidation and prioritization actions are accomplished by the database accompanying ndfSDpFDAs and its associated contacts data.

Note that the user's viewer for the IWeb will differ greatly whether unconsolidated (Table 1) or consolidated (Table 2) views are being offered. If the consolidated view is offered, this will resemble prior art contact managers (e.g. Outlook or ACT), except that it has numerous ndfSDpFDA fields (which can be hyperlinked) and the prior art contacts managers usually have only one such field, for its organization's domain URL. The IWeb's viewer can also incorporate a separate domain URL field.

IXc. Computing Equipment Used

In section IX's as well as in most other sections, the web servers are preferably Apache Web servers and the personal computer clients are running Microsoft Windows 2000 connected to the Internet and using Microsoft's Internet Explorer.

IXd. IWebContacts Components

IWebContacts components consists of the search and extraction facility, the database of ndfSDpFDAs with any associated and extracted contacts information of the ndfSDpFDAs, computing services to manipulate the database including fore-mentioned consolidation and prioritization services, any services that generate the query forms being sent, and any web or platform services to operate the above. The noted hash marks of FIGS. 13-19 show several IWeb components.

IWebContacts, the name of the IWeb contacts manager embodiment, has two types. Type 1 stores ndfSDpFDAs as text records and does not store other ndfSDpFDAs' contacts data. Type 2 stores ndfSDpFDAs and downloaded ndfSDpFDAs' contacts data. Each type has several embodiments.

IXe. IWebContacts, Type 1

Stores ndfSDpFDA without ndfSDpFDA's Associated Contacts Data

Figure 13:
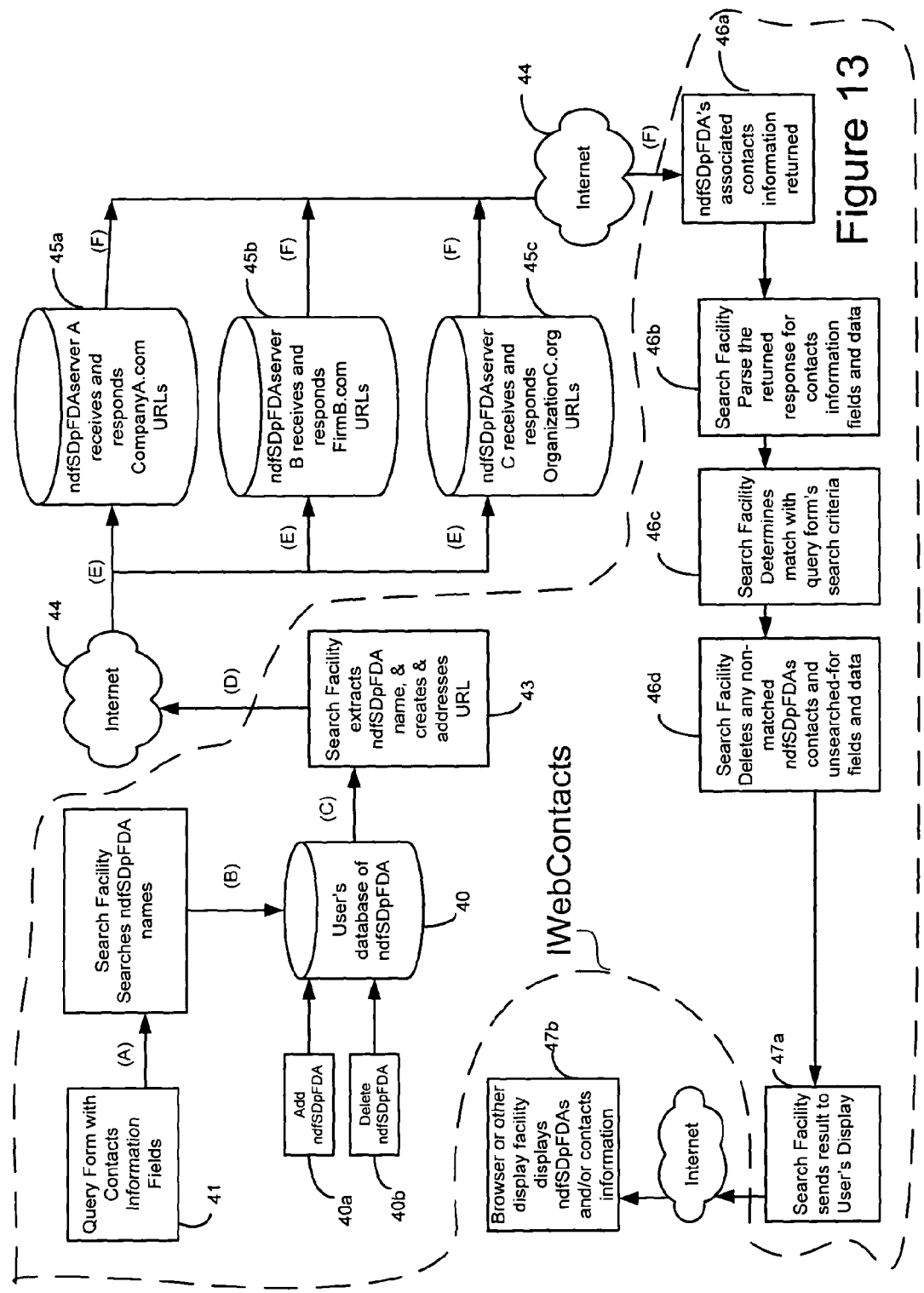
FIG. 13. shows how type I IWebContacts works in accordance with one or more embodiments of the invention.

FIG. 13 shows the invention-embodiment, an IWebContacts type 1. This IWebContacts has a database of user's stored ndfSDpFDAs, query search form, and search facility that can search the Internet for the ndfSDpFDAs' associated contacts data.

To illustrate Type 1, the user starts with the first seven ndfSDpFDAs of Table 1 in his ndfSDpFDAs database (40).

He adds (40a) a ndfSDpFDA by typing in Bob.Organization-C.org/life into his database. Of course, he can delete (40b) any of the ndfSDpFDAs.

To search, user receives a query search form (41) with search fields. In this example, the search fields include "Organization", "First Name", "Last Name", "Occupation", and "Contact". Other query search forms may have different search fields. The user searches for "Accountant" in the "Occupation" field. (Table 3).

TABLE 3

Sample Query Search Form, Search Fields, and "Occupation" Search

| Query | Organization | First Name | Last Name | Occupation | Contact |
|---|---|---|---|---|---|
| | | | | Accountant | |

A search facility would then extract (B & C) the text of the user's stored ndfSDpFDAs (40) and form URLs (43), one way by simply attaching http:// in front of any of the stored ndfSDpFDAs. IWebContacts' search facility then uses http://ndfSDpFDA to address (D) the Internet (44) and access a ndfSDpFDAserver. CompanyA.com is serviced by ndfSDpFDAserver A (45a); FirmB.com, ndfSDpFDAserver B (45B); and OrganizationC.org, ndfSDpFDAserver C (45C). These would respond with the web contents of the ndfSDpFDAs, as in the data in Table 1.

Upon receiving the response (46a), the user's search facility then parses it (46b) and determines whether the response contacts data meet the search criteria (46c). It deletes any non-matched ndfSDpFDAs and deletes any unnecessary fields' information (46d) in these ndfSDpFDAs. Then it sends results to user's display (47a), which can display a list of matching ndfSDpFDAs and/or their associated contacts data (47b).

In this example, when searching for "Accountant", user receives BobJones.CompanyA.com/biz and Bob.FirmB.com/accountant (and/or their associated contacts data) (Tables 4 & 5)

TABLE 4

Results Displayed on Browser as ndfSDpFDAs

BobJones.CompanyA.com/biz
Bob.FirmB.com/accountant

Or

TABLE 5

Results Displayed on Browser as ndfSDpFDAs with associated contacts data.

| | | | | | |
|---|---|---|---|---|---|
| BobJones.CompanyA.com/biz | Company A | Bob | Jones | Accountant | bob@companya.com |
| Bob.FirmB.com/accountant | Firm B | Bob | Johnson | Accountant | bob@firmB.com |

Major varieties of Type 1 are described below. The differences among these involve the questions: 1. are ndfSDpFDAs stored—local to the user or accessed online, 2. will it be a single or several ndfSDpFDAserver hosts handling the ndfSDpFDAs, 3. is the search facility within or independent of the ndfSDpFDAserver, and 4. how is the communications transferred between IWebContacts search facility and ndfSDpFDAservers?

These differences are important factors because where the ndfSDpFDAs are stored and processed greatly affect the speed and types of computing devices. For example a diskless web client or a palmtop may not effectively store contacts information locally. How the ndfSDpFDAs contacts data is data communicated also greatly affect the speed and the ease of programming, particularly since http is a stateless protocol going over remote data lines.

Figure 14:
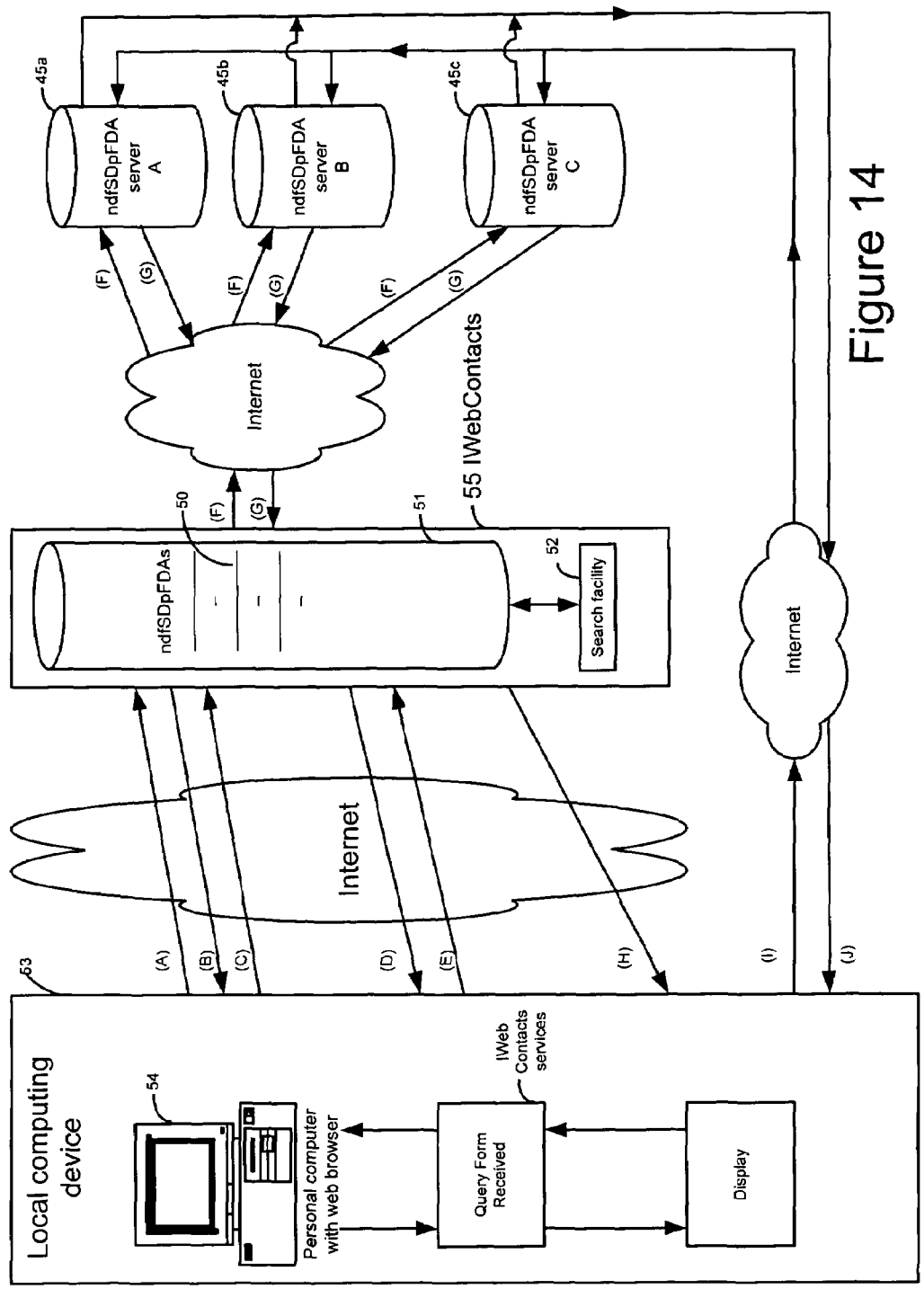
FIG. 14. shows an online embodiment of type I ndfSDpFDAs in accordance with one or more embodiments of the invention.

A. Embodiment A of Type 1 ndfSDpFDAs Online (FIG. 14)

In this embodiment, the user's ndfSDpFDAs (50) are stored on a web database (51) that the user has password access to. Both the web server and personal computer (54) are connected to the Internet. IWebContacts (55) contain ndfSDpFDA database, search facility, and web services.

The user uses a browser (54) to Internet access (A) his web ndfSDpFDA database. The IWebContacts (55) responds (B) by sending a display of the user's stored ndfSDpFDAs as URL links in his browser. The user can select a ndfSDpFDA-URL link to see full contacts data, or he can search on these ndfSDpFDAs.

Should the user searches (C), the IWebContacts (55) responds (D) with a web form with contacts data fields for searching (Table 4). Using his keyboard, the user inputs the search criteria, and submits (E) the form. The IWebContacts receives this search request, reads each of the user's stored ndfSDpFDAs (50), and Internet addresses (F) using http://ndfSDpFDA. The appropriate ndfSDpFDAserver (45a, 45b, or 45c) responds (G) with the ndfSDpFDA's contacts data. The IWebContacts search facility (52) parses and searches this contacts data to determine whether it meets the search criteria. IWebContacts then sends (H) matching ndfSDpFDAs and relevant associated contacts data to the user's personal computer as a list. The user can then further click (I) any received ndfSDpFDAs to activate the hyperlink that enables him to see (J) the ndfSDpFDA's associated contacts data on his browser.

Query search data communications standards will be set between IWebContacts' search facility and the ndfSDpFDAserver. This is accomplished by one of the various data communications methods above—HTML commentaries, XML, and others.

B. Embodiment B of Type 1 ndfSDpFDAs Local (FIG. 15)

Figure 15:
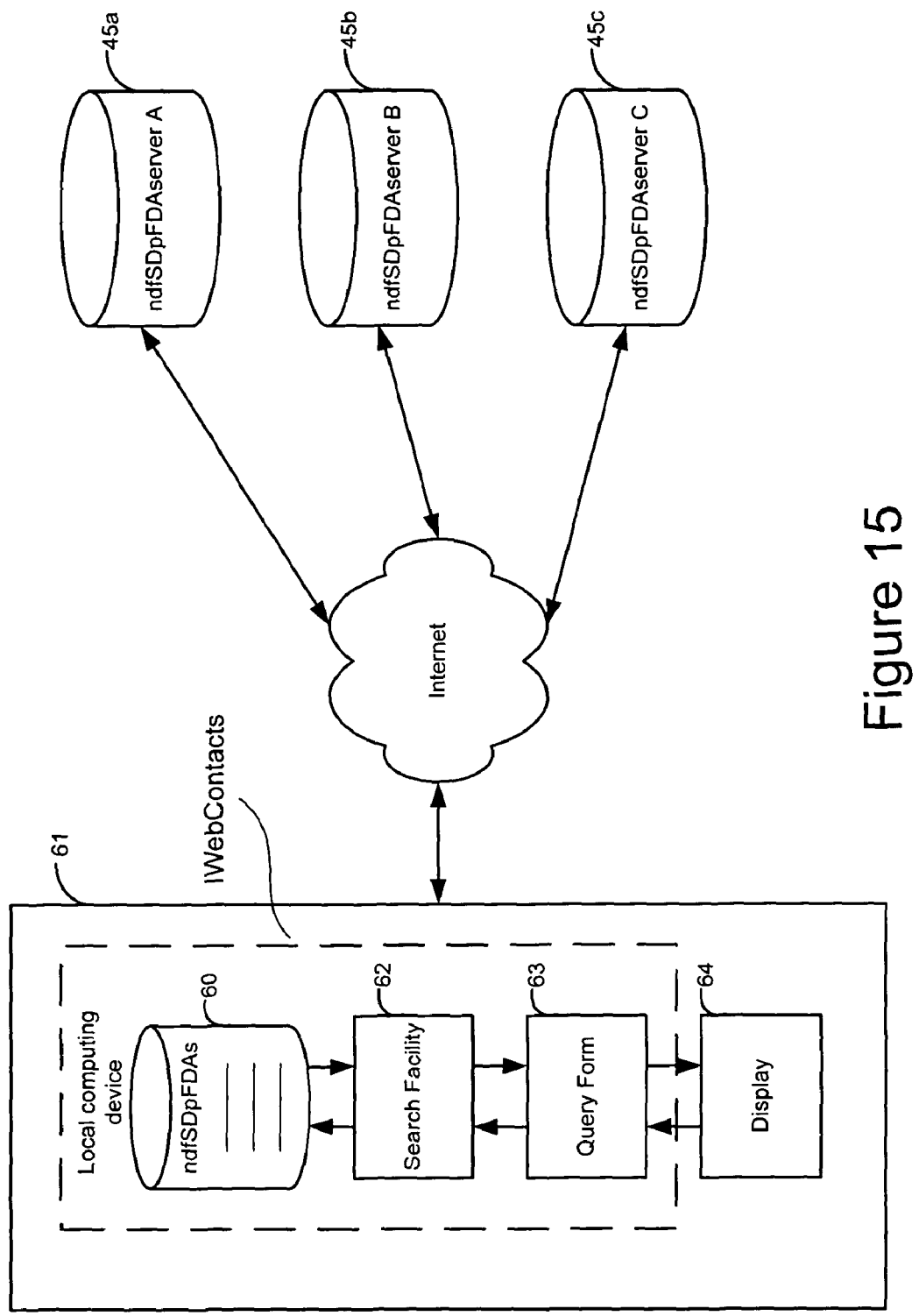
FIG. 15. shows a local embodiment of type I nSDFDAs in accordance with one or more embodiments of the invention.

In a second embodiment of type 1, as shown in FIG. 15, the user's ndfSDpFDAs are located in a searchable database (60) on his personal computer or other local computing devices (61), instead of on a web server. There are three ndfSDpFDAservers in FIG. 15, one for CompanyA.com, one for CompanyB.com, one for OrganizationC.org, all connected to the Internet.

When the user uses the query search form (Table 3) (63), the search facility (62) would extract the personal computer's database's ndfSDpFDAs (60), create a ndfSDpFDA-URL (http://ndfSDpFDA), and address their ndfSDpFDAservers. The ndfSDpFDAservers would return ndfSDpFDAs' contacts data and search facility would determine which meet the search criteria. The results would then be displayed on a browser (Table 4 and 5) (64).

Embodiment C of Type 1 ndfSDpFDAserver Host with Multiple Domain Names

In this embodiment, the ndfSDpFDAservers are located on a single host computing facility, instead of being located on different host computers or servers. This can be accomplished through setting the standard subdomains at different domains to be directed to the single host. Upon receiving the ndfSDpFDAs-URL call, the single-host ndfSDpFDAserver can parse the request to determine the ndfSDpFDA's subdomain, domain, and file directory and send back the appropriate ndfSDpFDA's web content. As an illustration, ndfSDpFDAservers 45a, 45b, and 45c of FIG. 15 would be all consolidated into at a single host server.

Figure 16:
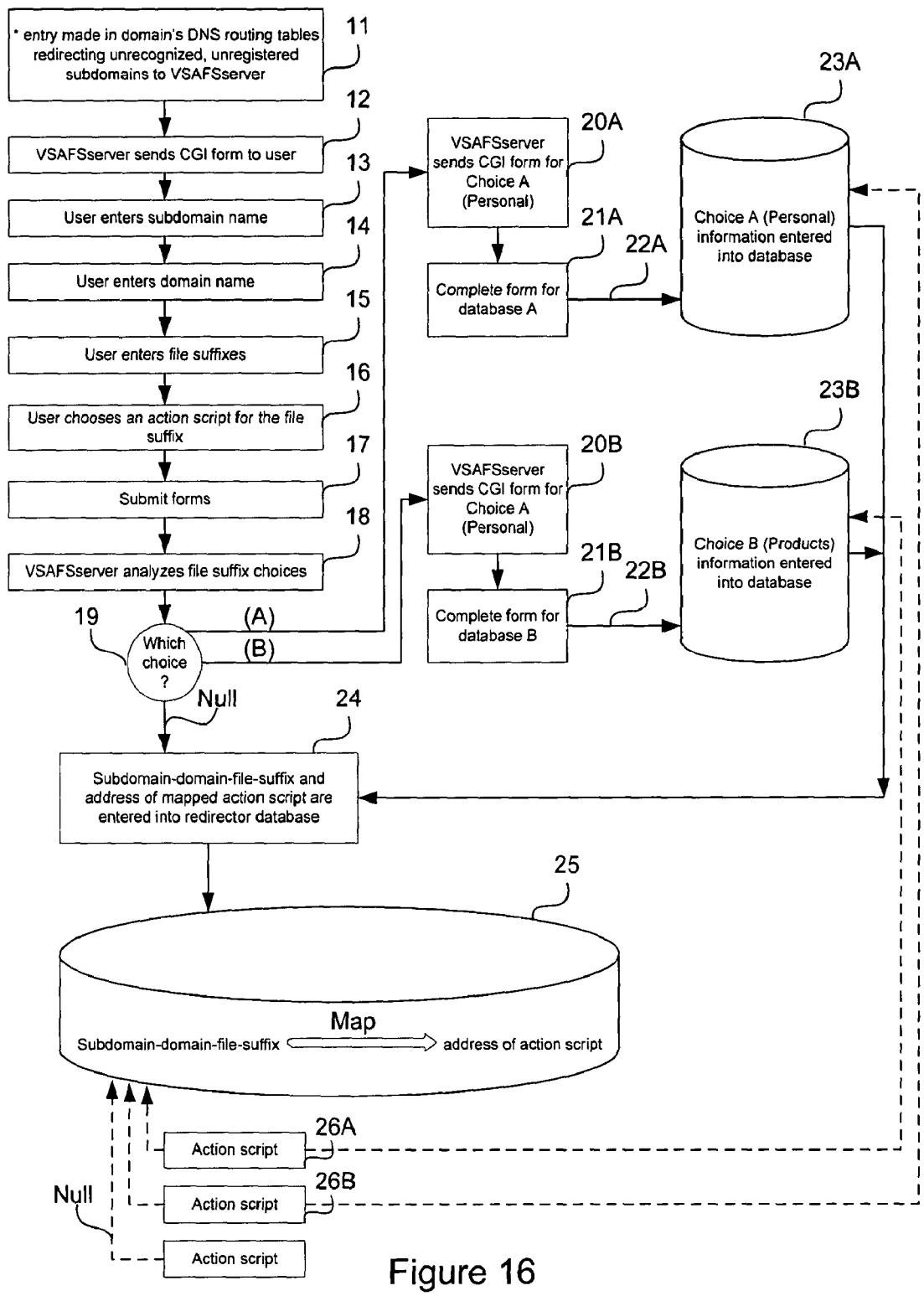
FIG. 16. shows a VSAFS server (Prior Art) in accordance with one or more embodiments of the invention.

A certain type of SDFDAserver is well suited for this purpose, the VSAFSserver designed in patent application Ser. No. 10,189,063, "Virtual Subdomain Address File Suffix", by Chen Sun. FIG. 16, which is FIG. 7 from Ser. No. 10,189,063, shows a VSAFSserver. This type of server is easy to implement, because the various ndfSDpFDAs' domains will simply have to place a single redirector device in their DNS table for the subdomains, and the VSAFSserver can take care of providing web contacts content from a single server.

If the search facility is also on the single-host ndfSDpFDAserver, the searches would be significantly faster, as much of the searching takes place on a single host computer, rather than multiple accesses through the Internet. Unlike http, which is a stateless protocol that is more difficult for programmers to program contacts data located on remote and scattered hosts; now, the programmers can more easily program the different domains' contacts data, as these are all centrally accessible. And, if the user's online ndfSDpFDAs were also on the same host, speed again would be greatly expedited.

IXf. IWebContacts Type 2 ndfSDpFDAs and Associated Downloaded Contacts Data are Stored

Figure 17:
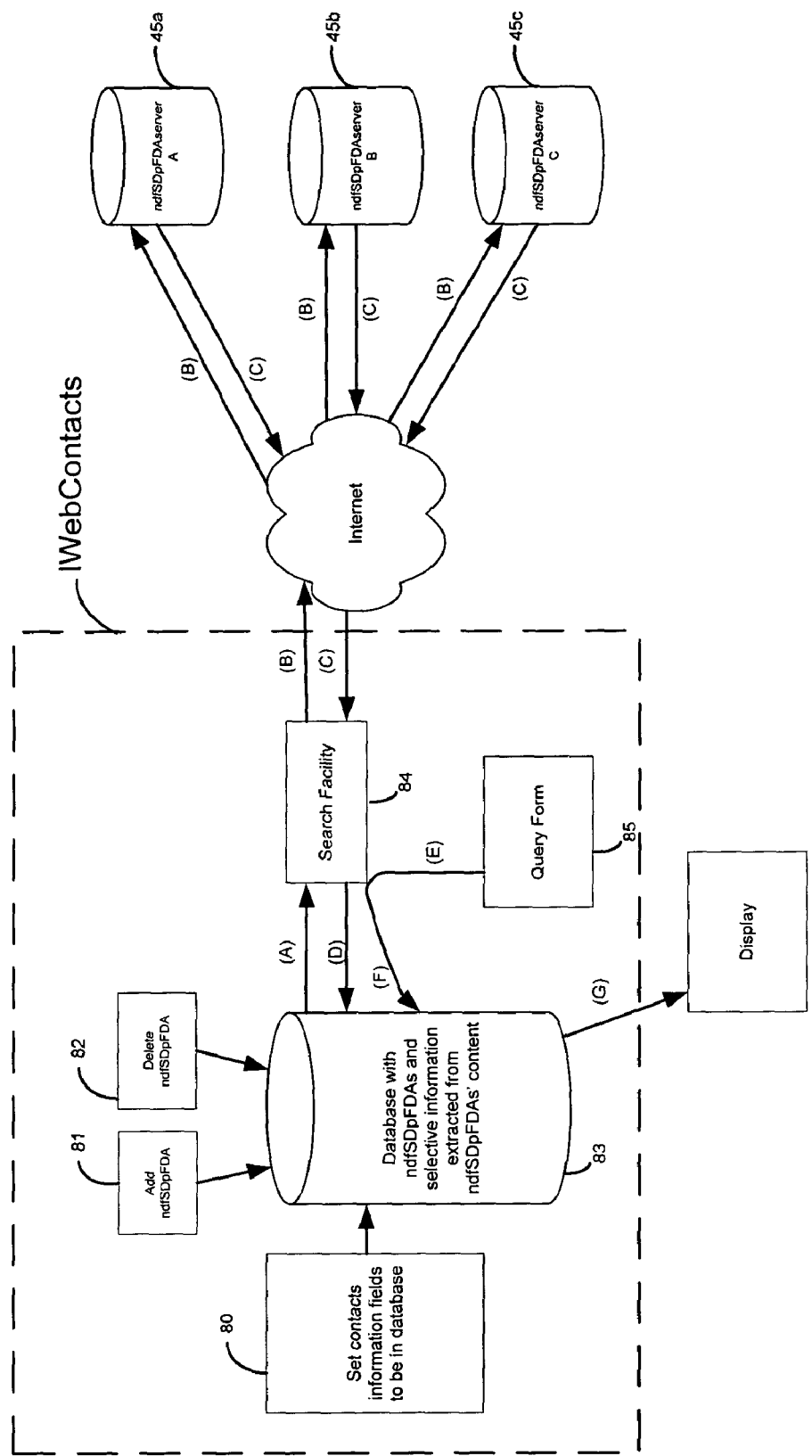
FIG. 17. shows how type 2 IWebContacts works in accordance with one or more embodiments of the invention.

FIG. 17 shows a second type of IWebContacts. This IWebContacts type has its own searchable database (83) where each record includes a ndfSDpFDA field and selected fields of the ndfSDpFDA's associated contacts data. The selected fields of contacts data are previously set (80). A user first populates his IWebContacts' database (83) by adding (81) and deleting (82) ndfSDpFDAs into the database's ndfSDpFDA field. The search facility (84) acquires (A) the newly added ndfSDpFDAs names from the database, adds "http://" to the ndfSDpFDAs to form URLs, Internet addresses (B) the ndfSDpFDA-URLs, and receives (C) the associated contacts data from the ndfSDpFDAservers (45a, 45b, 45c). The search facility then extracts the selected fields' data and saves (D) the data into the database (83). The data communications of fields information between the search facility and ndfSDpFDAservers is accomplished by HTML commentaries, XML, vCard format, and other methods previously described.

In having its own local database, IWebContacts type 2 can usually search much faster than an Internet access search to a ndfSDpFDAserver, as required in type 1.

For example, user's database and search facility have "First Name", "Last Name", and "Company" as selected contacts data fields. The owner of IWebContacts previously set these fields (80). The user enters (81) all the ndfSDpFDAs of Table 1 into the database.

The search facility (84) retrieves (A) the newly stored ndfSDpFDAs, uses the ndfSDpFDAs to address (B) the Internet and ndfSDpFDAservers and receives (C) the ndfSDpFDAs' contacts data. The search facility extracts data from the ndfSDpFDAs' First, Last, and Company Name fields and saves (D) these into a database's record along with their associated ndfSDpFDA. Using the ndfSDpFDAs of Table 1, the stored information in this IWebContacts database (83) is as in Table 6.

TABLE 6

IWebContacts' ndfSDpFDAs with selected contacts data fields' data

| Stored ndfSDpFDA | Contacts data Organization | Contacts data First Name | Contacts data Last Name |
|---|---|---|---|
| BobJones.CompanyA.com | Company A | Bob | Jones |
| BobJones.CompanyA.com/biz | Company A | Bob | Jones |
| BobJones.CompanyA.com/fun | Company A | Bob | Jones |
| Mary.CompanyA.com | Company A | Mary | Jones |
| Bob.FirmB.com | Firm B | Robert | Johnson |
| Bob.FirmB.com/accountant | Firm B | Bob | Johnson |
| Bob.OrganizationC.org | Organization C | Bob | Roth |
| Bob.OrganizationC.org/life | Organization C | Bob | Roth |

Now, a query search (85) for "CompanyA" would search (E) locally (F) and display Bob.CompanyA.com, Bob.CompanyA.com/fun, Bob.CompanyA.com/biz and Mary.CompanyA.com (G) faster than through a search accessed through the Internet (as in IWebContacts type 1). Tables 7 and 8 shows this IWebContacts type 2 search

TABLE 7

Query search form

| First Name | Last Name | Company |
|---|---|---|
|  |  | CompanyA |

TABLE 8

Search Results of IWebContacts type 2 with ndfSDpFDAs local

|  | Organization | First Name | Last Name |
|---|---|---|---|
| BobJones.CompanyA.com | Company A | Bob | Jones |
| BobJones.CompanyA.com/biz | Company A | Bob | Jones |
| BobJones.CompanyA.com/fun | CompanyA | Bob | Jones |
| Mary.CompanyA.com | Company A | Mary | Jones |

When using the priority and consolidation mechanism, the visual result would be rearranged, appearing as in Table 9, which resembles prior-art contacts manager, except that several ndfSDpFDA fields are also shown.

TABLE 9

Search Results of IWebContacts type 2 with ndfSDpFDAs local,
using prioritization and with different visual view

| Organization | First Name | Last Name | ndfSDpFDA |
|---|---|---|---|
| Company A | Bob | Jones | BobJones.CompanyA.com, BobJones.CompanyA.com/biz BobJones.CompanyA.com/fun |
| Company A | Mary | Jones | Mary.CompanyA.com |

Figure 18:
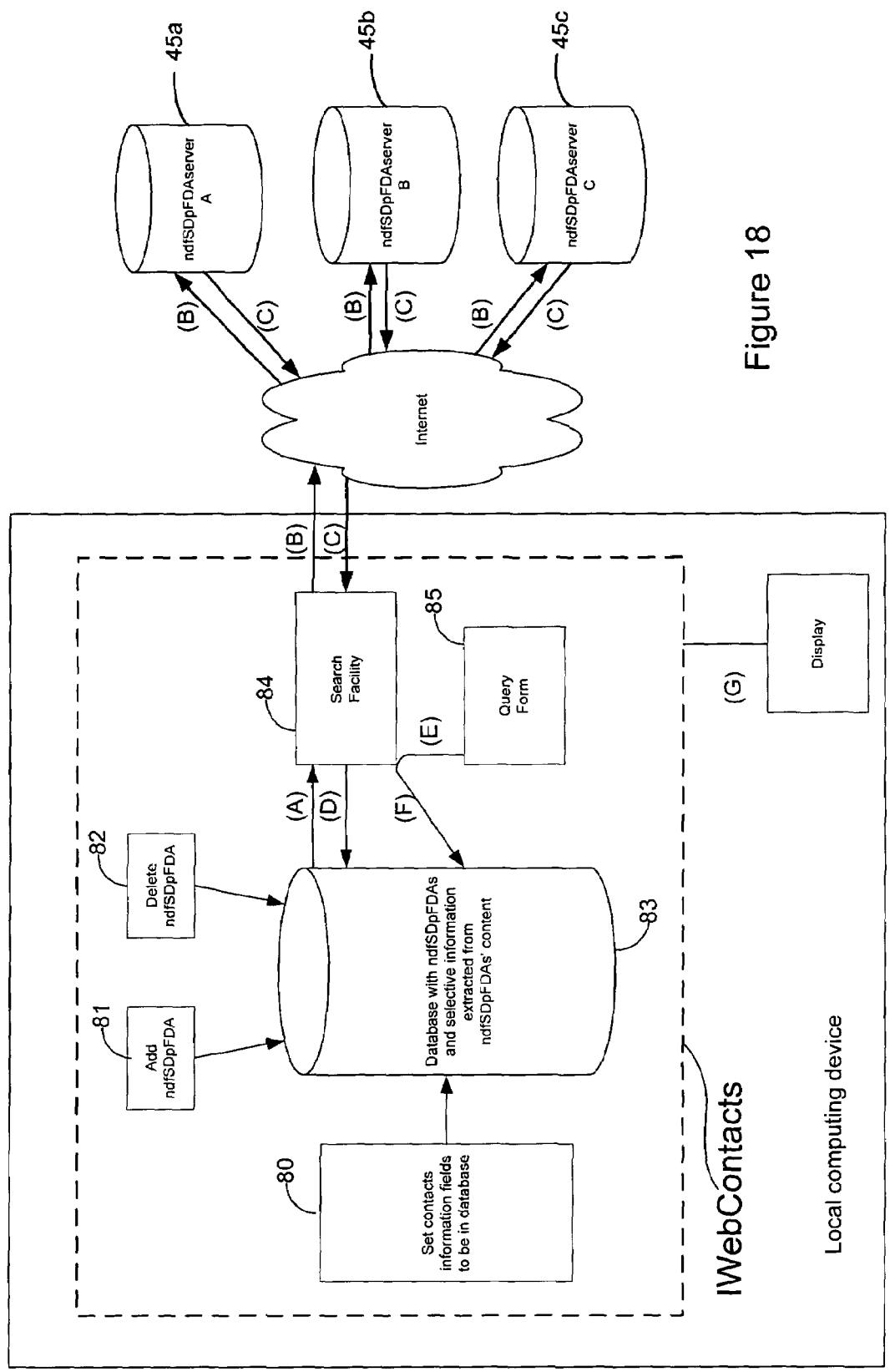
FIG. 18. shows a type 2 embodiment with local ndfSDpFDAs in accordance with one or more embodiments of the invention.

Embodiment A of IWebContacts Type 2 ndfSDpFDAs Local (FIG. 18)

In this embodiment, an IWebContacts type 2's ndfSDpFDAs' database (83), search facility (84), query form (85), and add and delete ndfSDpFDA function boxes (81 & 82) reside on a user's personal computer or other local computing device.

The user enters (81) ndfSDpFDAs into the ndfSDpFDAs' database (83), and search facility (84) then addresses (B) the Internet using these ndfSDpFDAs and downloads (C) the ndfSDpFDAs' associated contacts data.

Unlike the type 1 embodiments, the search facility (84) next extracts the data from selected fields of the downloaded contacts data. Then the data is saved (D) into the respective IWebContacts database fields (83) along with their respective ndfSDpFDAs. Query form (85) can then search (E,F) the ndfSDpFDAs' selected contacts data, without requiring Internet access.

IWebContacts can add computing routines to regularly Internet update its contacts database using current, on-line ndfSDpFDA contacts data.

Embodiment B of IWebContacts Type 2 with ndfSDpFDAs Online

FIG. 19

Figure 19:
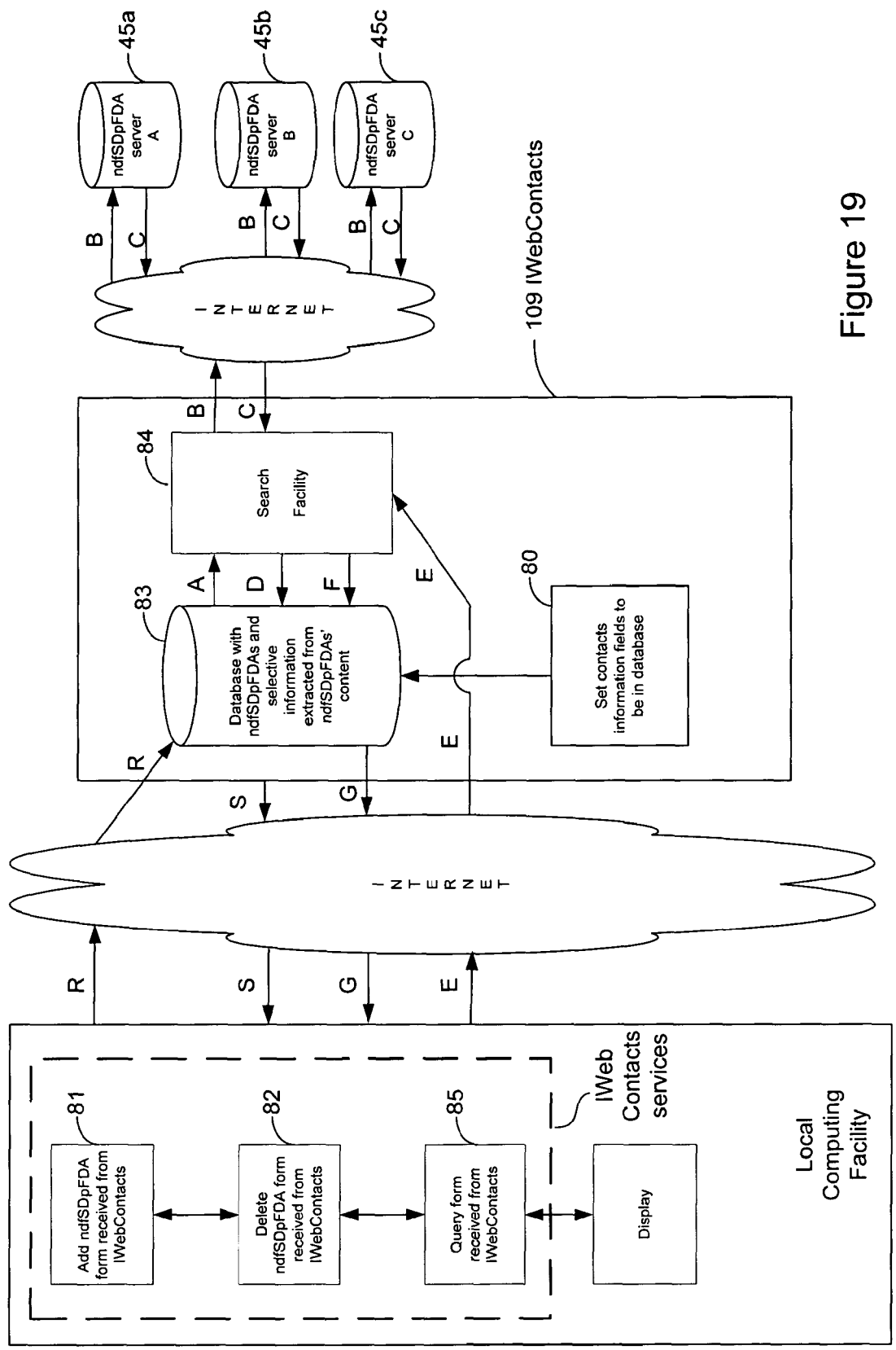
FIG. 19. shows a type 2 embodiment with online ndfSDpFDAs in accordance with one or more embodiments of the invention.

In this embodiment of type 2, the IwebContacts' ndfSDpFDAs and its selected contacts data are online and the user sees his ndfSDpFDAs as URL links in his browser, as shown in FIG. 19.

When he accesses his IWebContacts type 2 online, the user receives from the IWebContacts (109) access to his database of stored ndfSDpFDAs with selected contacts fields and data (83). He also receives on his browser a enter data box, sent by IWebContacts, where he can "Add ndfSDpFDA" (81). He enters and submits (R) his ndfSDpFDAs, and IWebContacts stores (R) these into the database.

As previously described for FIGS. 17 and 18, the search facility (84) uses (A) these ndfSDpFDAs as Internet URL addresses (by prefixing http://) and requests (B) ndfSDpFDAs' associated contacts data from the ndfSDpFDAservers (45a, 45b, 45c). The search facility can select data from specified contacts data fields. The ndfSDpFDAservers respond (C) with contacts data, and the search facility removes non-searched fields and data. The search facility then saves (D) selected contacts data and their respective ndfSDpFDA into the database (83).

When the user wishes to search his database, the IWebContacts sends (S) his browser a query search form (85), and he inputs. The query search form is then transmitted (E) to search facility (84), which then searches (F) his database (83). Search results consisting of selected ndfSDpFDA contacts data and respective ndfSDpFDAs are returned (G) to the local computing facility. Using this embodiment, the user then can search faster than having to access the Internet and contacting each domain's ndfSDpFDAservers for contacts data.

For example, using a browser, user accesses the website containing his ndfSDpFDAs, and receives "add ndfSDpFDA" box entry (81) sent by the IWebContacts. The user submits (R) ndfSDpFDAs of all the ndfSDpFDAs in Table 1. IWebContacts receives and adds these into the database (83).

Then, the search facility (84) extracts (A) and prefaces http:// to these ndfSDpFDAs to use to address (B) their respective ndfSDpFDAservers (45a, 45b, 45c). The ndfSDpFDAservers respond (C) with the information in Table 1. The search facility extracts the First Name, Last Name, and Company fields' data, discards the remaining fields and data, and saves the extracted fields data into the database (83) with their ndfSDpFDAs, as in Table 6.

To prioritize and consolidate, results in Table 10.

TABLE 10 ndfSDpFDAs' selected contact fields' data
are prioritized, consolidated, and stored

| Stored ndfSDpFDA | Contacts data Organization | Contacts data First Name | Contacts data Last Name |
|---|---|---|---|
| BobJones.CompanyA.com, BobJones.CompanyA.com/biz BobJones.CompanyA.com/fun | Company A | Bob | Jones |
| Mary.CompanyA.com | Company A | Mary | Jones |
| Bob.FirmB.com Bob.FirmB.com/accountant | Firm B | Robert | Johnson |
| Bob.OrganizationC.org Bob.OrganizationC.org/life | Organization C | Bob | Roth |

When the user wishes to search his database, the IWebContacts sends (S) him a query search form (85), and, in this example, he specifies "CompanyA" in the Company field. The form is returned (E) to IWebContacts, which then searches (F) its database (83). The results in Table 9 are returned (G) to the user.

IXf. Minor Differences in Using the "p" Privacy Module

The IWebContacts could not detect the usage of the privacy module in the ndfSDpFDA, so for IWebContacts, it could operate nearly as well using ndfSDFDAs instead. A few minor issues can occur and are resolved as follows.

a. This IWebContacts differs from a prior art contacts manager in that the owner of the ndfSDpFDA can easily change its URL address by changing its FD. IWebContacts then cannot download information. With Type 1 embodiments, all associated contacts information is lost. With Type 2, old information is stored.

b. In the event of a changed FD, the IWebContacts owner can publicly communicate with the nSD to request for a revised URLv.

IXg. Advantages of IWebContacts

IWebContacts using ndfSDpFDAs illustrates a number of valuable benefits both as a contacts manager invention-embodiment as well as an IWeb invention-embodiment.

1. The issuer of the ndfSDpFDA can easily communicate his SD and privacy controlled SDFD to another individual through verbal, written, and data communications of a easy-to-communicate nSDFDA syntax. This is unlike long talking of contacts information over the phone (e.g., from issuer to each recipient, "My name is spelled . . . , I work for . . . , my telephone number is . . . , You can contact me at . . . , my mailing address is . . . . Let me find a piece of paper to write down all this for you. I'll send you my card through postal mail).
2. The recipient simply types in a brief ndfSDpFDA, and this information is now storable and capable of being data processing manipulated. Compare this with having to type for minutes contacts information just to capture Name, Company, Address, etc. of a business card,
3. The organization affiliated with the issuer (the individual) has a vested positive interest, as its organization receives promotional benefits of its domain name, while the issuer is promoting himself. This is accomplished by having the organization's domain name being associated with the individual.
4. Unlike previous web contacts management technologies, the IWebContacts can accept contacts entities using multiple subdomains, multiple domain names, and with file suffix profiles. This enables for a single contacts manager to receive and manipulate profiles information from any number of domain names.
5. The IWebContacts can receive multiple privately profiled information from an individual and consolidate these to form a more comprehensive view of the individual.
6. The issuer can efficiently reuse his ndfSDpFDA with many IWebContacts. This can be through verbal communications, email transmission, handing over a piece of paper, and more. This issuer saves time.
7. The recipient can enter a nSDFDA into his contacts management system in less than 15 seconds and receive hundreds times more information than having to take several minutes to type in business card information.
8. It's no longer necessary to send an email with a vCard after a telephone conversation, as the issuer can on the phone simply verbally issue his nSDFDA, and the recipient can enter this when convenient. Also, recipients are frequently unwilling to reveal their email addresses and can't utilize vCard.

In short, by using ndfSDpFDAs together with an IWeb, this provides magnitudes of timesavings for the issuer as well as the recipient. No prior art has accomplished this. Patent application Ser. No. 10/074,081 invention (also by Chen Sun) contact manager lacked the privacy control and several profiles per individual features. Other prior web based contact management websites used a singular domain name, file suffix holding individual's names, singular profile, difficult-to-speak individual URL representation, additional coding systems, web handles, and other weakness. Other prior art, non-web contacts management system did not have dynamic updating of contacts information, required extensive typing to enter contacts data, did not have profiles of individuals tied into URLvs, and suffered many other weaknesses. A novel, non-obvious solution and significant business productivity improvement resulted from using ndfSDpFDA together with IWebs.

X. Other Embodiments

Developing an IWeb by Starting from a hWeb and its Immediate Resulting Differences Many IWebs can be designed by starting with prior arts software designs similar to hWebs' software in websites such as eBAY.com, Matchmaker.com, Ultimate Bulletin board discussion forum, HotJobs.com, online chats, and others, which are known arts of websites in eCommerce, dating, discussion forums, employment, online chats, and others. Though there may be tremendous varieties, all such hWeb sites deal with an individual's entity conducting exchanges and have an individual's entity's representation shown within the website. In the majority of these hWebs, a web handle is the individual's identity and representation. An IWeb usually can distinguish between identity and representation, as explained in sections XII and XIII below.

Programming changes that can be made to hWeb software to make these an IWeb include:

1. The web handle or other method of individual identification (e.g. email address) is replaced with a nURLv, preferably ndfSDpFDA.
2. The ndfSDpFDA used can be hyperlinked to http://ndfSDpFDA.
3. The hWeb be modified to use multiple web handles to represent a single individual, and such web handles are then replaced by ndfSDpFDA. For example, the hWeb can use Joe.GM.com/sedans, Joe.GM.com/Buick, and Joe.GM.com/Chevy.
4. The hWeb be modified such that when using the ndfSDpFDA as its individual's representation system, the hWeb can also Internet address such ndfSDpFDA, and extract data field information from http://ndfSDpFDA to be used for representation and identification information.
5. The hWeb be modified such that in addition to #3, a nSD text can represent the individual's identity information for all its ndfSDpFDA family. The identity can be used in computing routines such as individual branding characteristics, billing and shipping address, account information, and more.

In short, instead of the web handle system, IWebs use ndfSDpFDAs. The IWeb further searches and extracts the data field information from an individual's http://ndfSDpFDAs profiles to gather further representation and identity information on the individual. The IWebs can parse the ndfSDpFDA to use the text of nSDs for individual identity.

The result is that IWeb treats ndfSDpFDAs very differently than hWeb treats web handles. First, unlike a web handle, the ndfSDpFDA can be quickly web addressed (by prefixing http://) to attain web profile information. Next, when hyperlinked, the ndfSDpFDA is humanly readable as hyperlinked to http://ndfSDpFDA. Furthermore, an IWeb can accept several ndfSDpFDAs from a single individual. For example, in a commerce IWeb, an individual may use a FD for his sports sale items, a FD for his stamp collection, and a FD for his automobiles. Yet, IWeb can identify him through his single nSD text.

Where an IWeb uses multiple FDs of a single ndfSDpFDA family, the IWeb, unlike hWeb, may further process his multiple ndfSDpFDAs for additional individual information. Such processes may be, for example, taking an average of customer ratings for the ndfSDpFDA family members, accumulating all sales activities of the ndfSDpFDA family members, providing a single accounting system for the family, and more.

A significant time-saving advantage for the individual is that, unlike hWeb and web handles, the individual's same ndfSDpFDA can be used in many IWeb websites. To attain a hWeb web handle, the individual usually types his individual information into registration forms supplied by the hWeb.

Such information can include his name, address, occupation, and age. Using IWebs and ndfSDpFDA, the individual simply enters in his relevant ndfSDpFDA for that IWeb website, and the IWeb extracts the information from the entered http://ndfSDpFDA's exchangeable data. The same ndfSDpFDA can then be entered into other IWeb websites, saving him tremendous amount of user registration time, and enabling him to quickly carry his identity and representation to other websites. For example, Joe of GM (from above) can quickly enter Joe.GM.com/sedans at multiple IWeb sites offering car sales and enter Joe.GM.com/technical (below section XII & XIII) at multiple IWeb employment sites.

Notice in the below section that the types of data exchanged by the various ndfSDpFDAs to the IWebs are quite different. In the above contact manager, we saw contacts information. In below, there are commerce, dating, employment, political, social, security, and other types of information. ndfSDpFDAs and IWebs are flexible and wide-ranging in the type of data fields that are utilized, which is different from other forms of individual identification, representation and exchange systems.

XI. Impact of the ndfSDpFDA and Additional Embodiments

Changing the hWeb to an IWeb by changing web handles to ndfSDpFDA in a system may appear to be a minor convenience, but its social, political, economic, and Internet impact can be great.

A. eCommerce

Consider the case of eCommerce and a hypothetical dominant web individual auction site, Monopoly.com (for example, eBAY.com). Monopoly.com provides a way for individuals to auction products, and owns 70+% of its marketplace. The barriers to entry in Monopoly.com's marketplace are: its brand name, its numbers of buyers and sellers, and the amount of time it takes for an individual to list his products with another website. Let's suppose new hWeb websites Competitor1.com, Competitor2.com, . . . , and CompetitorN.com offered identical services as Monopoly.com, and offered these with a promotional offer of no transaction fees for three years. Such competitors still face a high barrier to entry because it takes time for a seller to list his products at each Competitor's site, and listing at these new sites with few buyers would multiply his time costs of selling tremendously.

Suppose the seller received a webpage designed for eCommerce exchanges at one of his ndfSDpFDA page (e.g., his own eCommerce online catalogue). This webpage enables him to list all his products for sale, and carries data fields and data for his products. After listing once, the seller can quickly enter this ndfSDpFDA to sell at the newly revised Competitor1.com, Competitor2.com, . . . , and CompetitorN.com IWebs. The impact is that one of Monopoly.com's major barriers-to-entry (listing time) nearly disappears (particularly true if Monopoly.com also used IWeb). Using IWebs instead, Competitor1.com, Competitor2.com, . . . . CompetitorN.com's promotional offer of no listing fees coupled with minimal time required for product listing, will motivate individual sellers to list with them, and over time, will form a sizable sales inventory. Buyers can also register quickly at these CompetitorN.com IWebs by conveniently entering in their purchasing ndfSDpFDA representations.

The result is that many competitive marketplaces will emerge to compete against the dominant Monopoly.com. And with more competitive sites, the power and focus of the eCommerce shifts to the individual rather than to dominant websites. Service prices drop, service selections improve, and more and better commerce develops.

B. Matchmaking

Another case is matchmaking sites. Again, many quality sites create a barrier to entry by having a lengthy dating questionnaire for individuals. Once the individual completes it, he is reluctant to visit another site to fill out another lengthy questionnaire. In using ndfSDpFDA and IWeb matchmaking sites, the applicant is able prepare his dating profile ndfSDpFDA webpage, and then quickly enter this ndfSDpFDA representation to many matchmaking sites, thereby, improving the degree of competition in the dating marketplace.

C. Employment

Another case of hWeb to IWeb benefits is the employment websites. The job applicant can quickly submit his ndfSDpFDA employment information to several IWeb employment websites instead of having to fill out extensive forms for each site. Again the power shift and convenience favors the Individual rather than the websites. This is described in detail with Joe of GM.com's work experience profiles below.

D. Political and Social IWebs

IWebs and ndfSDpFDAs will also impact political and social organizations. These organizations rely heavily on the participation of individuals. In most prior-art websites, the individuals typically received an email newsletter, a public announcement website and web-handled discussion forums. Yet, the individual is not well identified and represented when if he participates in this prior art website.

Using an IWeb with the organization's domain name and ndfSDpFDA, the political and social individuals can better identify and represent themselves better and learn more about other individuals in the organization. This improves networking and bonding through the IWeb, allows for identified discussion forums, enables better organization and assignment of responsibilities, and improves communications among individuals. These IWebs will improve political and social organizations, will create new forms of associations based on common-affiliations-with-same-domain-name-website, transcend borders, and will change the way people participate politically and socially worldwide.

E. Alumni Websites

Still another case is web networking services for college alumni. In prior arts, the alumni are typically given a web handle or use their real name and then possibly participate in the alumni's discussion forums and directories. Yet, the purpose of much of this networking is to simultaneously establish a business networking relationship. Using IWebs' discussion forums, the alumni can enter in the alumni IWeb and then participate using their business firm's issued ndfSDpFDA, thus quickly identifying and promoting their business interests while also participating in and promoting the school's activities.

F. Digital Identification

Major firms are trying to set standards in a field known as digital identification (http://www.digitalidworld.com/index.php). Microsoft's entry, Passport, has many commerce transaction authentication features, and is backed by the power of a monopoly. But it lacks an individual's representation that is useful in digital and non-digital communication channels and that is communicable by individuals to website as well as by individuals to individuals, such as ndfSDpFDA & IWeb has and can. As such, Passport has been mildly received (relative to its expectations). Furthermore, many powerful interests, including credit card companies, computing companies, banks, etc. refuse to partner with Passport in part because they fear Microsoft's monopoly control and Passport's information gathering would lead to Microsoft controlling information on their valuable customers' base.

Passport-technology-like (Passport-like) products' marketplace acceptance can be easier achieved through coupling ndfSDpFDA with Passport-like products. The ndfSDpFDA can provide representation information about the individual, and Passport-like products provide authentication about financial information for when the individual conducts eCommerce. The ndfSDpFDA is useable by websites and other individuals seeking to identify the ndfSDpFDA; whereas, Passport-like authentication system is useful primarily by websites. Thus this combination introduces Passport-like authentication to a wider audience's acceptance.

Firms concerned about Microsoft's monopoly position can, instead be brought in as allies on Passport-like technologies for financial authentication. The firms can brand the ndfSDpFDA or link through this, and then utilize a Passport-like technology in the background; hence, the firms have greater control and would feel less threatened by a monopoly control. Again, ndfSDpFDA reduces the monopoly control by a firm while providing better representation to websites and other individuals. By coupling ndfSDpFDA identity and representation with Passport-like technology's financial authentication, a better financial services system results.

G. National Defense

Iwebs and ndfSDpFDA are mutually enhancing—that is, increase the popularity of one, and the other's popularity will also increases. An increase in use of ndfSDpFDA can also have tremendous social impact. Take for example the area of national defense. Presently, there are devices such as eye scanners, fingerprinting systems, passports, driver licenses, etc. to identify individuals. However, scanners and fingerprinting systems are not useful on a small scale. For example, a terrorist can bomb a small building, but it would be too expensive to install and operate these specialty devices in smaller buildings. How does anyone working in the small building identify a stranger who enters the building?

The stranger's organization or a special federal agency can create a ndfSDpFDA certification administrator, who certifies, on behalf of the organization or agency, the stranger's certified ndfSDpFDA webpage, transmitted by the secure https protocol if desired. The users (stranger) are unable to change a certified ndfSDpFDA's web content, and such content states the certifier authority.

The small building's staff can check out the stranger by reviewing a ndfSDpFDA provided by him. https://ndfSDpFDA or http://ndfSDpFDA would show the stranger's photo and information. If the building's staff then trusts the organization's domain's certifier or the federal agency certifier, then, it relies on this information to check on the stranger. No extra specialty equipment, extra telephone calls, carry-ID photographs, biometric devices, and other traditional or expensive methods is needed-just simple access to the Internet. If the staff does not trust the certifier, then more extensive investigations will be needed. Nevertheless, the cost of national defense is reduced through the usage of this inexpensive individual identification system.

For example, Gail Smith of FBI.gov has the ndfSDpFDA of GailSmith.FBI.gov/generalID, which carries her photo, states she is a FBI employee, and certifies that FBI has reviewed her information. Gail Smith is unable to change the content of this webpage, or her subdomain name; these are under the control of FBI.gov's certifier. The security system can even be made such that only the certifier can change her file directory name (through passwords only known to certifier, or this pFD change process does not allow for certified FDs to be changed by uncertified individuals). If the building staff trusts the domain FBI.gov, they will then be able to identify Gail Smith through her photo. If Gail Smith made a telephone call to inquire for information, the building staff access http://GailSmith.FBI.gov/generalID, determine if they trust the domain name FBI.gov and its certifier, and if so, notice Gail Smith's telephone number listed, and call that FBI number—to make sure it is Gail Smith who made the telephone call. Likewise Joe of GM.com can be identified thus, if the user trusts GM.com. Notice that by checking the domain name and reviewing its reputation, the building can infer the quality of the certification of the ndfSDpFDA page. These are low level of security checks; yet, it is very inexpensive and can be implemented worldwide easily.

H. Summary of Section XI Cases and Embodiments

In numerous cases above—contacts management, eCommerce, matchmaking, employment, national defense, digital identification, alumni directory—the impact of using ndfSDpFDA to participate in IWebs is shown to be able to shift the entire economic, power, social, and political structure of the Internet and the world.

XII. IWeb's Individual Identity

The Text of the nSD

Using Table 1's data, an IWeb can identify the individual by his first and last names. But how will an IWeb identify same name individuals? More importantly, first and last names may not be available in many IWebs. And other means of identification have restrictions. Social Security numbers would be useful only to United States workers. Most people are reluctant to release credit card numbers to be used as public identity. eMail addresses of syntax name@adomain.com are spammable.

Both hWeb and IWeb gather information on and track the individual's identity and representation information. Such information may include the individual's reputation, billing, contact, shipping, web statistical, demographics, and other information. Such can be seen in eBay.com and Matchmaker.com websites.

To better understand identity and representation, take for the example, a marketplace site designed for individuals to sell four wheeled cars. hWeb software, such as prior arts software running eBay or a classified car marketplace site, would require their own unique web handle system for individuals' representations. Web handle examples are "fromglobaltoyou", "browneyedgirl022", "faithingintheprize", "beauty25", "lively505", and "beach296", where these represent and identify individuals.

Instead of using web handles, IWeb can use ndfSDpFDAs for the IWebs' individuals' representations—for examples (returning to Joe of GM's profiles in section III above) Joe.GM.com, Joe.GM.com/Buick, Joe.GM.com/Chevy, Joe.GM.com/sedans, and Joe.GM.com/56kje26, as well as, Mary.Ford.com/Mustang, Kate.Mercedes.com/trucks, and Chen.WebAndNet.com/personalcar. All these ndfSDpFDAs have associated exchangeable information and can contribute to this IWeb's overall car sales. Unlike hWeb, an IWeb can use multiple ndfSDpFDA representations of an individual. A single IWeb can also use multiple domain names in its ndfSDpFDAs.

We can understand the concepts of individual identity and profile representation in an IWeb through the Joe of GM.com example from above. Http://Joe.GM.com has sparse and public information and, in this invention's system, none of Joe of GM's FD profiles is continual information, as Joe.GM.com's FDs can change. Hence, no one of Joe's FD names, DFD (domain-file-directory) combination names, or profiles can be used for adequate Joe identification for the IWeb.

Let's also review an employment IWeb site. Joe may wish to use several resumes. For example, http://Joe.GM.com/technical shows his technology resume; http://Joe.GM.com/management shows his management skills; http://Joe.GM.com/sales shows his sales experience. Each of the ndfSDpFDAs, when addressed, can show exchangeable resume data fields to the IWeb. For example, Joe.GM.com/technical and Joe.GM.com/sales may show, when addressed, XML fields that reflect various programming languages he's familiar with and years of sales experience. Joe.GM.com/management may show, when addressed, HTML commentary fields indicating his years of management experience.

Both the car and employment IWebs need to identify and track the individual Joe of GM.com with his IWeb-participating profiles information—to establish an identification for Joe to be used for matters such as credit worthiness, buyers' rating systems, shipping address, etc.

As explained above, an individual's subdomain and domain names are usually continual. By using the text of the "nSD" (not the same as http://nSD), this forms an unique identity system that is continual. Recall that a ndfSDpFDA family of profiles has the same nSD text. Hence, the nSD text portion of the ndfSDpFDA can serve as the individual's identity in an IWeb. And because the http://nSD is unique in the Internet (due to DNS), this same nSD text can be used by many IWebs to identify the same individual. Note that here the term "represent" here reflects the individual's ndfSDpFDA's web profile and profile content and is different from the term "identify", his individual's identity to the IWeb site. (Note also that an individual may have several identities, by having his name associated with several domain names in a nSD syntax. IWeb would see each such identity as distinct).

Hence, the individual identity used by IWeb is the nSD text portion of the ndfSDFDA. This is accomplished by the IWeb parsing the ndfSDpFDA for the text nSD. In the example used, it "Joe.GM.com" is the identity. This is not the same as the http://Joe.GM.com address or its web content. The various Joe.GM.com/FD, including Joe.GM.com/sedans, Joe.GM.com/Chevy, Joe.GM.com/managerial, Joe.GM.com/technical, . . . are representations and when addressed are profiles. The "Joe.GM.com" text as identity is the same as the Joe.GM.com as nSD, but without the inference that it relates to the web content of http://nSD (http://Joe.GM.com).

XIII. IWeb, nSD, and Branding

Also, because the various IWebs can keep track of the individual through nSD-text-as-identity; and because the http://nSD is an unique identity due to DNS and is web addressable with web content; the individual's nSD-text-as-identity branding characteristics can be established across multiple IWebs, as well as across the Internet. One way is that each IWeb can submit a rating of an individual's nSD-text-as-identity to a rating service and the cumulative result of his IWebs' nSD-text-as-identity ratings is seen as the an individual's Internet branding characteristic. For example, if Joe of GM.com sells cars at hypothetical IWeb websites such as autosales.com, carsales.com, autoauctions.com (and someday IWebs eBay.com and Yahoo.com), all these sites could submit buyers' feedback for Joe.GM.com's various profiles to a seller's rating service, which would provide a cumulative rating for Joe.GM.com, and hence branding for the individual Joe of GM.com. Likewise for a Betty.Ford.com, Jack.Mercedes.com, Fran.Honda.com . . . .

ndfSDpFDA ratings can be further accumulated to form a rating for the domain. Since the domain represents the organization (as explained above), this then can become the rating and branding for the organization. Hence, if several employees of GM.com using n.GM.com/FD profiles (with their own "n" names) were to receive poor ratings, their cumulative poor rating would result in a poor rating for GM.com. Such can be accomplished by computing algorithms that average the accumulated ratings for GM.com's ndfSDpFDAs.

XIV. ndfSDpFDA Web Content Authorizes Interaction with IWeb

It preferred that http://ndfSDpFDA displays which IWeb websites are authorized to interact with it. For example, Joe of GM wants to sell his sedans in hypothetical IWeb websites autosales.com and carsales.com, but not at autoauctions.com. Joe enters a private (password protected) user-input, authorization module webpage and he inputs the texts "autosales.com" and "carsales.com" as authorized IWebs for Joe.GM.com/sedans. Through web database and other known programming techniques, http://Joe.GM.com/sedans then displays, in an "IWeb authorization" data field exchangeable section, that "autosales.com" and "carsales.com" are authorized IWebs.

A coding mechanism is set up for the "IWeb authorization" data field. An IWeb extracts and assesses its authorization before accepting an ndfSDpFDA as a participant. For example, using the HTML commentaries methodology described above, "autosales.com <!--Iweb authorized website-->" can be extracted as a data field. Autosales.com will subsequently authorize "Joe.GM.com/sedans" as participant in autosales.com's web marketplace. XML and other data communications methodologies can also be used to designate authorized fields.

An unauthorized IWeb may ignore its authorization status and can continue to participate an ndfSDpFDA's web content and representation, but the IWeb's users can check http://ndfSDpFDA as to correct authorization. An ndfSDpFDA may also block an unauthorized IWeb participation usage by refusing to supply data field information to an unauthorized IWeb's URL call.

Figure 20:
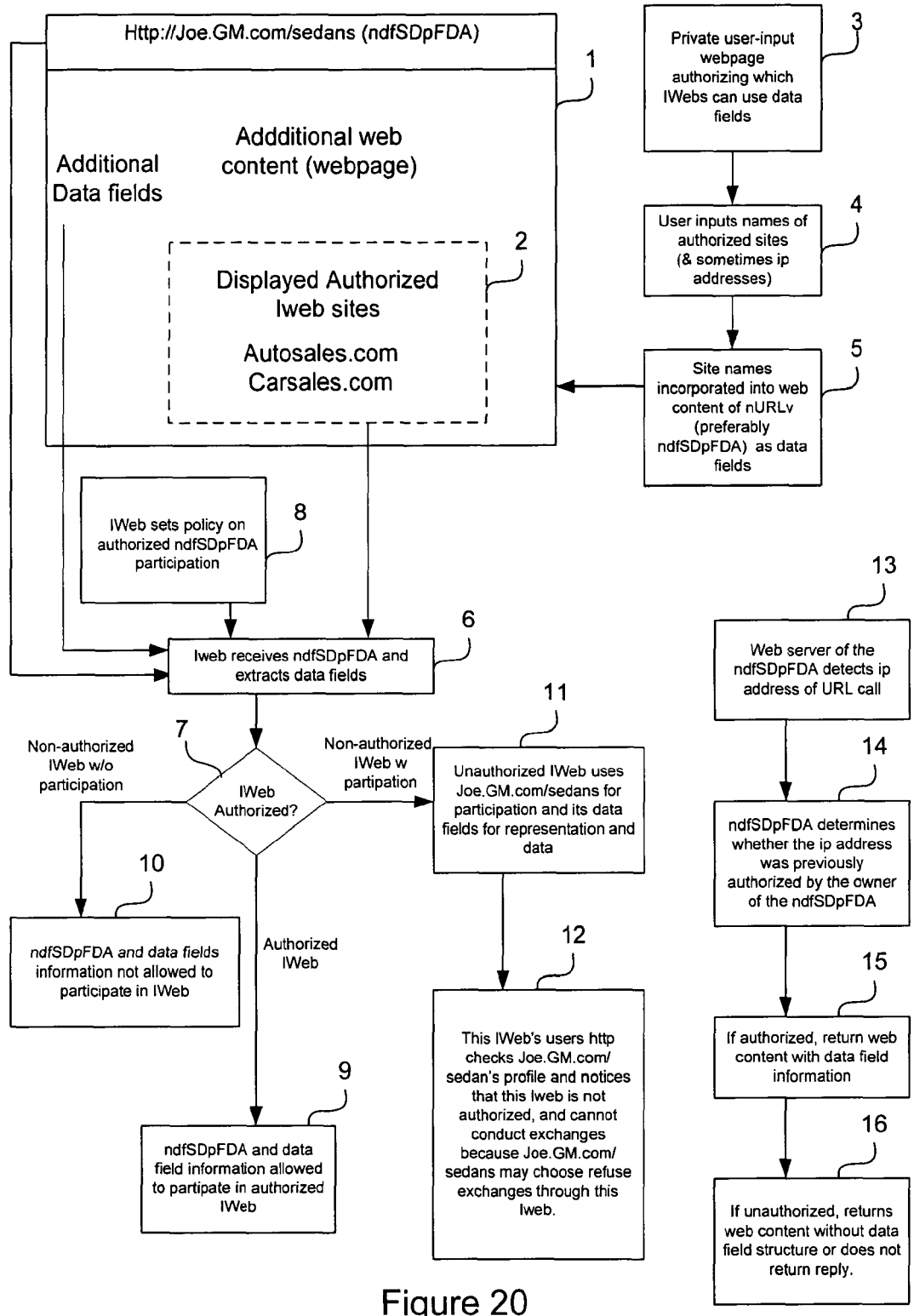
FIG. 20. shows an IWeb authorization process in accordance with one or more embodiments of the invention.

FIG. 20 shows the above processes. Http://ndfSDpFDA (Joe.GM.com/sedans) webpage (1) displays a set of authorized websites' names, "autosales.com" and "carsales.com" (2). Joe of GM.com had entered a private "site authorization" module webpage (3) and inputted (4) in names of authorized IWebs. This module then incorporates (5) these names as part of the web display content of http://Joe.GM.sedans in a section with data fields for IWeb authorized sites. This incorporation can be accomplished by several methods, which are known to web programmers. If, for example, the http://Joe.GM.com/sedans is created by a web database, the database would incorporate and display the IWeb names through previously programmed database routines. If, instead, http://Joe.GM.com/sedans is a static webpage, programming routines would add the IWeb names as part of authorized IWeb data fields in the static webpage. Numerous other incorporation means are known.

Http://Joe.GM.com webpage then displays these authorized websites (2). The IWebs autosales.com and carsales.com can extract (6) data field information from http://Joe.GM.com/sedans and determine (7) their status authorization through the data of the authorized IWeb sites section (2). Being authorized, autosales.com and carsales.com can then use Joe.GM.com/sedans additional data fields' information to sell and buy cars for Joe (9).

Unauthorized IWebs can also extract Joe.GM.com/sedans's data field information. These may have policies (8) to exclude Joe.GM.com/sedans from participation (10). Or, these may have policies (8) to ignore their authorization status and participate Joe.GM.com/sedans (11); in which case, users will have to check http://Joe.GM.com/sedans for authorization status (12) to ensure Joe of GM.com approves of the interactions.

Routines can be programmed whereby only the authorized IWeb can extract selected data field information. For example, the ndfSDpFDA's web server would identify an IWeb's URL call request and ip address (13) and release data field structure and/or information only to the authorized ip requests (14) (15). The ndfSDpFDA owner had previously inputted authorized IWeb ip addresses in step (4). In this way, the http://ndfSDpFDA can refuse unauthorized data extraction URL calls.

For example, a http://ndfSDpFDA may display no data field information to all URL calls except when the call originates from authorized ip addresses. This can be accomplished by detecting ip addresses and changing web content depending on the ip address. The web server and the ndfSDpFDA would detect the originating URL call's ip address, and, when authorized, return with webpage content which contains the HTML commentary fields or XML used as data fields. Unauthorized URL calls (as detected by their ip addresses), when attempting to extract data fields, would receive web content without the data field structure or would not receive reply.

XV. Variants nURLv s other than ndfSDpFDAs can be used for nURLv-IWeb interactions and for individual representation and identity. For example, ndfSDpFSA can be used with equal technical capabilities, but it is not preferred because it is more difficult to verbally communicate. IWebs can accommodate many types of nURLvs, as will be explained.

Other variants are that sub-subdomain domain file directory naming syntax (e.g. Bob.Jones.CompanyA.com/biz) may be used. The addressing principles here work the same as the above because of the hierarchical structure and nature of DNS, Internet, and web server addressing schemes. Those knowledgeable in DNS structures and web addressing would know this. Also, higher still order subdomains and longer file suffixes can be used.

Another variant is that the FD/ (with the ending "/") is used instead of the FD. The FD/ version may be more efficient for the http addressing, but it is longer to communicate (particularly when spoken), hence the FD version is preferred.

Also in many circumstances, it would be useful for individuals other than web administrators and programmers to change n of nSD. For example, an individual who gets married can have an automated means to change her name rather than to wait on the domain administrators. The above examples, particularly in FIGS. 7 and 8, show that this is possible to design by placing the pcsm module starting at step 13 where subdomain names are requested (explained above).

Also, the physical host and its communications lines of the IWeb software can be important. If the IWeb is located on a single host with the rest of the SDFDs, it would not require http access to attain its ndfSDpFDA data. Http is a non-continual state protocol, and its programming is much more difficult. By having the IWeb and the SDFD on a single host (or connected through high speed data lines not requiring http), this can make IWeb and ndfSDpFDA interactions much easier, access much faster, and programming much easier.

The public communications channel can reside on ndfSDpFDAs other than the nSD.

The nSDFDAs can also be located in a palmtop or kiosk instead of a personal computer and use a different kind of Internet client than a web browser. The operating system of the servers can change to Microsoft's Windows NT Server, the web server can change to Microsoft's Internet Information Server. Other operating systems and web servers can also be used. Users' operating system can certainly be other versions of Windows as well as non-windows operating systems. In still other embodiments, add-on applications may be used to expedite data transmissions and make the searches more user-friendly and fast.

Where the words "personal computer" or "local" are used, these can represent workstations that are part of a local area or wide area network. Here, instead of accessing nSDFDAs on a local hard disk, nSDFDAs may be on the network's hard disk. The technologies for local and wide area networks are well understood, and the terminologies above, when referred to as local, applies to the technologies of these local and wide area network devices.

Physical location of the various components may also differ. For example, in IWebContacts, it sometimes makes very little difference whether the routine that generates the "Add nSDFDA" box comes from a web server or a personal computer.

XVa. Variant

"df" not Required on IWeb

Most IWebs will use "df"s, and as such, ndfSDpFDAs are the preferred nURLv. There will be circumstances where the "df" (data fields) is unimportant, as for example in the discussion forums. Here the nSDpFDAs can be used to represent individuals. Associated non-data-field web content (e.g. HTML webpage without data fields) can be used to represent the individuals. These nSDpFDAs are used very much like web handles, except that they have the additional capabilities of being easily hyperlinked to be Internet addressed (by simply adding http://) and of being humanly visibly understood as hyperlinked to or having the address of http://nSDpFDA. For example, in a discussion forum, a user can click an individual participant's nSDpFDA hyperlinked link, and the individual participant's http://nSDpFDA profile comes up on another browser. This user simply wishes to read the individual's profile's non-data-field webpage (HTML) information.

Another example can be an association members' web index, where the members' nSDpFDAs are hyperlinked to http://nSDpFDA and are arranged alphabetically, and one can click these to read a member's profile on a webpage. Still another example is where the IWeb arrange the ndfSDpFDA names in a set order, and use it as a hyperlinked index, without having to pull in the data fields of the nURLvs. In these and other cases, the nSDFD, nSDFS, nSD can be effectively used by the IWeb.

XVb. Variant

IWeb and the Privacy Module in ndfSDpFDA

IWebs generally do not automatically know whether the privacy module has been included, as after the privacy module works, the IWeb receives the new nSDFD and may not be able to accurately check whether pcsm was used without using special routines. Where IWebs use ndfSDpFDA or ndfSDpFSA, the ndfSDFDA or ndfSDFSA versions (without the privacy control) can also be frequently used, as in the example of the IWebContacts above. Special routines can be added to detect the changes in pFD. For example, the user may voluntarily inform (submit to) the IWeb that a change in pFD has occurred, and the IWeb revise its information accordingly. Or, the IWeb may be able to detect characteristics of the second pFD, as IWeb has the individual's nSD name and history, to determine whether its web content the same as the first pFD.

XVc. Variant

Visitor's Introduction nURLv Input Field

When a visitor visits the http://ndfSDpFDA with the public channel of communications (usually http://nSD), the visitor can quickly introduce himself by typing in his own ndfSDpFDA into a visitor's input box on the same webpage as the public channel communications webpage. For example, if Joe of GM.com visits http://Chen.WebAndNet.com, he can input "Joe.GM.com/Buick" into http://Chen.WebAndNet.com's user-input box for visitor's ndfSDpFDAs, and Joe.GM.com/Buick will be forwarded to Chen for Chen's introduction to http://Joe.GM.com/Buick.

XVI. Summary

The above invention forms an individuals' exchange system comprising of:
1. a nURLv system of ndfSDpFDA with the person's name as the subdomain and having exchangeable data with an IWeb.
2. The http://ndfSDpFDA which can offer privacy control by changing the file directory name,
3. a spam-resistant communications channel addressable through nSD,
4. a individuals' exchange system (IWeb) that can use these ndfSDpFDAs for individual representation and exchange,
5. A branding of the nSD individual established through IWebs accumulating information on the ndfSDpFDA,
6. A branding of the domain organization established through IWebs accumulating information on the ndfSDpFDA, and
7. A means whereby ndfSDpFDA can authorize which IWebs can use its exchangeable data fields.

FIGS. 4 and 12 show the overviews of this invention, FIGS. 5-11 show various pFD processes and ndfSDpFDA embodiments, FIG. 13-19 show an embodiment of a contacts manager, and FIG. 20 shows the authorization process. Several detailed embodiments of a layman-user-friendly-FD-change-processes are detailed, an embodiment of an IWeb-ndfSDpFDA interaction of a contacts manager is detailed, and eCommerce, matchmaking, employment, discussion forum, and political organization embodiments, usefulness, and impact are explained.

While the disclosure contained herein has set forth several embodiments of the invention, and many of the fundamental components used within the invention are well known within the art, it will be appreciated by those skilled in the art that variations to the combination of elements and steps disclosed can be made without departing from the scope and spirit of the invention.

What is claimed is:

1. A method for managing data associated with a data profile, comprising
    providing a web server hosting facility;
    providing first domain name on a first server and a second domain name on a second server, wherein the first server and the second server are separate from the web server hosting facility;
    storing, on the web server hosting facility, a first web-accessible data profile accessible using a first subdomain name concatenated to the first domain name with any file suffixes and a second web-accessible data profile accessible using a second subdomain name concatenated to the second domain name with any file suffix, wherein the first subdomain name concatenated to the first domain name is part of a first identity of a first individual and the second subdomain name concatenated to the second domain name is part of a second identity of a second individual;
    searching and extracting, in response to receiving a first URL comprising the first subdomain name and the first domain name, first extracted data from the first web-accessible data profile;
    searching and extracting, in response to receiving a second URL comprising the second subdomain name and the second domain name, second extracted data from the second web-accessible data profile, wherein searching and extracting the first extracted data and the second extracted data is performed on the web server hosting facility without accessing any other web facility, whereby performance is improved; and
    organizing the first extracted data and the second extracted data based on the first identity and the second identity, respectively.

2. The method of claim 1, further comprising:
    replacing, subsequent to storing the first web-accessible data profile, a file suffix associated with the first web-accessible data profile by a new file suffix, wherein the first URL comprises the new file suffix.

3. The method of claim 1, further comprising:
    consolidating the first extracted data based on the first identity, wherein data items in the first extracted data that are extracted with any file suffix in the first URL are grouped together.

4. The method of claim 1, wherein the subdomain name is not registered in Domain Name System.

5. The method of claim 1 further comprising:
    redirecting calls comprising the first URL to the web server hosting facility.

6. The method of claim 1, wherein the any file suffix is a virtual subdomain address file suffix.

7. A method for managing data associated with a data profile, comprising:
    providing a web server hosting facility;
    providing a plurality of websites stored outside the web server hosting facility;
    redirecting web calls from the plurality of websites to the web server hosting facility, wherein at least one of the web calls corresponds to a URL comprising a domain name of one of the plurality of websites and a subdomain name, wherein the subdomain name concatenated to the domain name is part of an identity of an individual among a plurality of individuals;
    providing a plurality of data profiles associated with the plurality of individuals to the web server hosting facility, wherein at least one of the plurality of data profiles is associated with the identity of the individual and is accessible using the URL;
    searching and extracting, in response to receiving the URL among the redirected web calls, data from the at least one of the plurality of data profiles to obtain extracted data, wherein searching and extracting the data to obtain the extracted data is performed on the web server hosting facility without accessing any other web facility, whereby performance is improved; and
    organizing and consolidating the extracted data based on at least the identity of the individual, wherein data items in the extracted data that are extracted with any file suffix in the URL are grouped together.

8. The method of claim 7, wherein the subdomain name is not registered in Domain Name System.

9. A host facility comprising:
    a host server comprising a processor;
    a plurality of websites stored outside a facility repository; and
    the facility repository coupled to the host server and with functionality to:
        receive redirected web calls that are redirected from the plurality of websites, wherein at least one or the redirected web calls corresponds to a URL comprising a domain name of one of the plurality of websites and a subdomain name, wherein the subdomain name concatenated to the domain name is part of an identity of an individual among a plurality of individuals;
        store a plurality of data profiles associated with the plurality of individuals, wherein at least one of the plurality of data profiles is associated with the identity of the individual and is accessible using the URL;
        search and extract, in response to receiving the URL among the redirected web calls, data from the at least one of the plurality of data profiles to obtain extracted data, wherein searching and extracting the data to obtain the extracted data is performed on the facility repository without accessing any other web facility, whereby performance is improved; and organize and consolidate the extracted data based on at least the identity of the individual, wherein data items in the extracted data that are extracted with any file suffix in the URL are grouped together.

10. A method of using a name of an individual in a Uniform Resource Locator (URL) as an identity, comprising:
consolidating the name of the individual with a domain name to obtain a consolidated address acting as an identity of the individual, wherein the domain name corresponds to a first web server;
supplying web content associated with the identity of the individual, wherein the web content is stored in a second web server accessible using a URL comprising the consolidated address and a http preface, wherein the second web server is separate from the first web server;
extracting, in response to receiving the URL, data in the web content to generate extracted data, wherein extracting the data to generate the extracted data is performed on the second web server without accessing any other web facility, whereby performance is improved; and
organizing, prioritizing, and consolidating the extracted data based on the identity.

11. The method of claim 10, further comprising:
display the extracted data based on the identity.

12. A local database system for storing extracted data to expedite processing, comprising:
a local repository; and
a processor and memory storing instructions when executed on the processor comprising functionality to:
extract data using a plurality of web addresses to obtain the extracted data, at least one of the plurality of web addresses comprising a subdomain name concatenated to a domain name with any file suffix, wherein the subdomain name concatenated to the domain name is part of an identity of an individual;
select a portion of the extracted data based on the identity of the individual to obtain selected data for storing in the local repository;
organize, prioritize, and consolidate the selected data based on the identity of the individual, wherein data items in the selected data that are extracted with any file suffix in the at least one of the plurality of web addresses are grouped together; and
display the selected data based on the identity.

13. The local database system of claim 12, wherein the selected data may be obtained from the local repository without accessing Internet.

14. The local database system of claim 12, wherein the extracted data is stored on the web.

15. A system for presenting web content, comprising:
a compact database based on a plurality of identities of a plurality of individuals, at least one identity of an individual is according to a identity syntax based on a domain name and a name of the individual, wherein the domain name and the name of the individual is included in a URL corresponding to a domain-named website hosted on a web server separate from the compact database;
a web service configured to extract information associated with the plurality of individuals for storing in the compact database, wherein information associated with the individual having the at least one identity is accessible using the URL comprising the at least one identity;
a processor executing instructions for:
extracting, selecting, organizing, prioritizing, and consolidating, in the compact data base without accessing any other web facility whereby performance is improved, the information associated with the plurality of individuals based on the identity syntax, and
presenting the information associated with the individual based on the at least one identity of the individual.

16. The system of claim 15, wherein the information associated with the plurality of individuals comprises multiple webpages associated with each of the plurality of identities that are consolidated into a single data object for each of the plurality of identities.

17. The system of claim 15, wherein the single data object is a combined webpage.

18. The system of claim 15, wherein the web service is configured with functionality to receive a query notifying a change of a file suffix in the URL to a new file suffix, and move the information associated with the individual having the at least one identity based on the new file suffix, wherein the file suffix and the new file suffix are user controlled modifiable file suffixes for privacy purposes.

* * * * *